United States Patent
Lavoie et al.

(10) Patent No.: US 10,621,013 B2
(45) Date of Patent: Apr. 14, 2020

(54) AUTOMATED SYSTEMS AND METHODS FOR GENERATING EXECUTABLE WORKFLOWS

(71) Applicant: Optum, Inc., Minnetonka, MN (US)

(72) Inventors: John L. Lavoie, Minnetonka, MN (US); Michael Kelly, Minnetonka, MN (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 16/023,744

(22) Filed: Jun. 29, 2018

(65) Prior Publication Data
US 2020/0004604 A1    Jan. 2, 2020

(51) Int. Cl.
G06F 9/54    (2006.01)
G06F 16/901  (2019.01)

(52) U.S. Cl.
CPC ............ *G06F 9/54* (2013.01); *G06F 16/9024* (2019.01)

(58) Field of Classification Search
None
See application file for complete search history.

(56) References Cited

U.S. PATENT DOCUMENTS

| | | |
|---|---|---|
| 6,917,829 B2 | 7/2005 | Kwong |
| 7,299,244 B2 | 11/2007 | Hertling et al. |
| 8,799,286 B2 | 8/2014 | Cooper et al. |
| 8,973,012 B2 | 3/2015 | Chen et al. |
| 9,335,911 B1 | 5/2016 | Elliot et al. |
| 2007/0244650 A1 | 10/2007 | Gauthier |
| 2012/0046966 A1 | 2/2012 | Chang et al. |
| 2012/0227044 A1 | 9/2012 | Arumugham et al. |
| 2013/0253942 A1 | 9/2013 | Liu et al. |
| 2014/0075350 A1 | 3/2014 | Gauthier et al. |
| 2014/0278475 A1 | 9/2014 | Tran |
| 2014/0282367 A1* | 9/2014 | Harrill ............ G06F 8/31 717/105 |
| 2014/0337072 A1 | 11/2014 | Tamblyn et al. |
| 2015/0088851 A1 | 3/2015 | Deshpande et al. |
| 2015/0310445 A1 | 10/2015 | Chan et al. |

(Continued)

OTHER PUBLICATIONS

Ng, Kenney, et al., PARAMO: A Parallel Predictive Modeling Platform for Healthcare Analytic Research using Electronic Health Records, Apr. 1, 2014, J Biomed Inform., 29 pages, https://www.ncbi.nlm.nih.gov/pmc/articles/PMC4075460/, Nov. 21, 2018.

(Continued)

*Primary Examiner* — Tuan C Dao
*Assistant Examiner* — William C Wood
(74) *Attorney, Agent, or Firm* — Alston & Bird LLP

(57) ABSTRACT

Various embodiments are directed to systems and methods for automatically constructing executable workflows comprising a plurality of executable modules. The system comprises a workflow assembly platform configured to review metadata associated with each of the plurality of executable modules to be included within the workflow and to automatically generate links for passing data between the selected executable modules such that execution of the workflow by an execution platform results in data flow from a workflow input, through each of the included executable modules, to generate and execute a workflow.

21 Claims, 16 Drawing Sheets

(56) References Cited

U.S. PATENT DOCUMENTS

| | | | |
|---|---|---|---|
| 2016/0132299 A1* | 5/2016 | Harrison | G06F 9/44505 |
| | | | 717/107 |
| 2016/0147938 A1 | 5/2016 | Mcconnell et al. | |
| 2016/0147946 A1 | 5/2016 | Von Reden | |
| 2017/0109481 A1 | 4/2017 | Johnson et al. | |
| 2018/0007145 A1* | 1/2018 | Piechowicz | G06Q 50/10 |
| 2018/0232422 A1* | 8/2018 | Park | G05B 15/02 |

OTHER PUBLICATIONS

Costa, Flavio, et al., Capturing and Querying Workflow Runtime Provenance with PROV: a Practical Approach, Mar. 18, 2013, Proceedings of EDBT/ICDT '13, Italy, 8 pages, http://citeseerx.ist.psu.edu/viewdoc/download?doi=10.1.1.428.6172&rep=rep1&type=pdf, Nov. 21, 2018.

Belle, Ashwin, et al, Big Data Analytics in Healthcare, Jul. 1, 2015, BioMed Research International, 16 pages, vol. 2015, https://www.ncbi.nlm.nih.gov/pmc/articles/PMC4503556/, Nov. 21, 2018.

\* cited by examiner

Analytics Store

Welcome, User   Help   Sign Out

Jobs

🗑 Delete

| ☐ | Workflow ◇ | Status ◇ | | Start Time ◇ | End Time ◇ | Total Time ◇ | # of Patients ◇ | # of Records ◇ | # Discarded ◇ | Job ID ◇ |
|---|---|---|---|---|---|---|---|---|---|---|
| ☐ | Monthly ETG | Running | ✗ | 00:01:00 | -- | -- | -- | -- | -- | -- |
| ☐ | POA | Failed | ○ | 00:01:00 | 00:02:00 | 00:02:00 | 0 | 0 | 0 | 12345-3298-abcd |
| ☐ | HEDIS | Successful | ⊘ | 00:01:00 | 03:01:12 | 02:00:12 | 1,012,443 | 13,432,445 | 1 | 12345-3298-abcd |
| ☐ | Opoid Risk | Successful | ⊘ | 00:01:00 | 01:01:11 | 01:00:11 | 908,003 | 3,366,778 | 0 | 12345-3298-abcd |

Show 10 per page   «First  «Previous  Page 1 of 1   Total Records: 4  Next»  Last»»

✦ Sort Columns  ☰ Show/Hide Columns

AUTOMATED SYSTEMS AND METHODS FOR GENERATING EXECUTABLE WORKFLOWS

BACKGROUND

The process of building executable workflow programs comprising a plurality of executable modules is generally a manually-intensive process requiring program developers to manually write computer code based at least in part on the platform on which a particular workflow is intended to be executed. Even in instances in which an existing workflow is adapted for operation with a different execution platform and/or for passing data among otherwise incompatible executable modules, significant manual modifications are often required to the underlying computer code to adapt and/or entirely rewrite the workflow for the new execution environment.

Accordingly, a need exists for systems, methods, and computing environments configured to automatically generate and execute workflows made up of disparate executable modules.

BRIEF SUMMARY

Various embodiments are directed to computerized workflow generation platforms for building workflows comprising a plurality of executable modules. The workflow generation platform enables data outputs from one or more executable modules to be passed to data inputs of other executable modules to execute the workflow, based at least in part on metadata stored in association with each of the individual executable modules and/or the corresponding workflow. Certain embodiments may be paired with a user-friendly graphical user interface configured to accept user input selecting a plurality of individual computer executable modules to be incorporated into a composite workflow and the underlying program generation platform automatically ensures data may be passed between the selected executable modules of the composite workflow to enable seamless integration of multiple executable modules within a single composite workflow. Moreover, in certain embodiments the program generation platform is configured to automatically select and include foundational executable modules in instances in which a selected executable module requires input data generated via the foundational executable computing program, as indicated based on metadata associated with one or more executable modules.

Various embodiments are directed to an automated workflow generation platform for constructing executable workflows. In certain embodiments, the automated workflow generation platform comprises: one or more memory storage areas configured for storing a plurality of executable modules, wherein the executable modules each comprise executable binaries and corresponding program metadata; and one or more processors configured to: receive input indicative of included executable modules, wherein the included executable modules collectively comprises a subset of the plurality of executable modules for inclusion within a workflow, and store the workflow within one of the one or more memory storage areas for execution.

In various embodiments, the one or more processors are further configured to automatically build one or more links each configured to pass data from an output of a first of the included executable modules to an input of a second of the included executable modules. The one or more processors may be further configured to generate an executable workflow object comprising data indicative of a directed acyclic graph including the included executable modules, and to store the workflow within the one or more memory storage areas comprises storing the workflow object within the one or more memory storage areas. Those links may comprise an application program interface (API) generated by the development platform. In certain embodiments, the one or more processors are further configured to execute the workflow utilizing one or more data sets stored within one of the one or more memory storage areas. Moreover, the one or more processors may be further configured to detect input errors upon determining that one or more input characteristics of at least one of the included executable modules are unsatisfied based at least in part on the program metadata for each of the included executable modules.

In certain embodiments, the one or more processors are further configured to automatically order the included executable modules within the workflow based at least in part on the program metadata associated with each of the included executable modules. The input may be indicative of included executable modules may comprise user input data. In certain embodiments, the one or more processors are further configured to: retrieve one or more foundational executable modules based at least in part on program metadata associated with one or more of the included executable modules; and update the included executable modules to further include the one or more foundational executable modules.

Various embodiments are directed to a computer-implemented method for constructing executable workflows. In certain embodiments, the method comprises: storing, via at least one of a plurality of memory storage areas, a plurality of executable modules, wherein the executable modules each comprise executable binaries and corresponding program metadata; receiving, via one or more processors, input indicative of included executable modules, wherein the included executable modules collectively comprises a subset of the plurality of executable modules for inclusion within a workflow; and storing, via at least one of the plurality of memory storage areas, the workflow within one of the one or more memory storage areas for execution.

In certain embodiments, the method may further comprise steps for automatically building one or more links each configured to pass data from an output of a first of the included executable modules to an input of a second of the included executable modules. The method may further comprise steps for generating an executable workflow object comprising data indicative of a directed acyclic graph including the included executable modules, and wherein storing the workflow within the one or more memory storage areas may comprise storing the workflow object within the one or more memory storage areas.

In certain embodiments, the one or more links comprise an application program interface (API) generated by the development platform. In certain embodiments, the method may comprise executing the workflow utilizing one or more data sets stored within one of the one or more memory storage areas. Moreover, the method may comprise steps for detecting input errors upon determining that one or more input characteristics of at least one of the included executable modules are unsatisfied based at least in part on the program metadata for each of the included executable modules. In certain embodiments, the method comprises steps for automatically ordering the included executable modules within the workflow based at least in part on the program metadata associated with each of the included executable modules.

In various embodiments, the input is indicative of included executable modules may comprise user input data. Moreover, the method may comprise steps for retrieving one or more foundational executable modules based at least in part on program metadata associated with one or more of the included executable modules; and updating the included executable modules to further include the one or more foundational executable modules.

Various embodiments are directed to a computer program product comprising a non-transitory computer readable medium having computer program instructions stored therein, the computer program instructions when executed by a processor, cause the processor to: store a plurality of executable modules within at least one of a plurality of memory storage areas, wherein the executable modules each comprise executable binaries and corresponding program metadata; receive input indicative of included executable modules, wherein the included executable modules collectively comprises a subset of the plurality of executable modules for inclusion within a workflow; and store the workflow within one of the one or more memory storage areas for execution.

In certain embodiments, the computer program instructions when executed by a processor, cause the processor to automatically build one or more links each configured to pass data from an output of a first of the included executable modules to an input of a second of the included executable modules. Moreover, the computer program instructions when executed by a processor, may cause the processor to generate an executable workflow object comprising data indicative of a directed acyclic graph including the included executable modules, and storing the workflow within the one or more memory storage areas comprises storing the workflow object within the one or more memory storage areas. In certain embodiments, the one or more links comprise an application program interface generated by the development platform. Moreover, the computer program instructions when executed by a processor, may cause the processor to execute the workflow utilizing one or more data sets stored within one of the one or more memory storage areas. In certain embodiments, the computer program instructions when executed by a processor, cause the processor to detect input errors upon determining that one or more input characteristics of at least one of the included executable modules are unsatisfied based at least in part on the program metadata for each of the included executable modules.

In various embodiments, the computer program instructions when executed by a processor, cause the processor to automatically order the included executable modules within the workflow based at least in part on the program metadata associated with each of the included executable modules. Moreover, the input may be indicative of included executable modules may comprise user input data. In certain embodiments, the computer program instructions when executed by a processor, cause the processor to: retrieve one or more foundational executable modules based at least in part on program metadata associated with one or more of the included executable modules; and update the included executable modules to further include the one or more foundational executable modules.

BRIEF DESCRIPTION OF THE SEVERAL VIEWS OF THE DRAWINGS

Reference will now be made to the accompanying drawings, which are not necessarily drawn to scale, and wherein:

Figure 9:
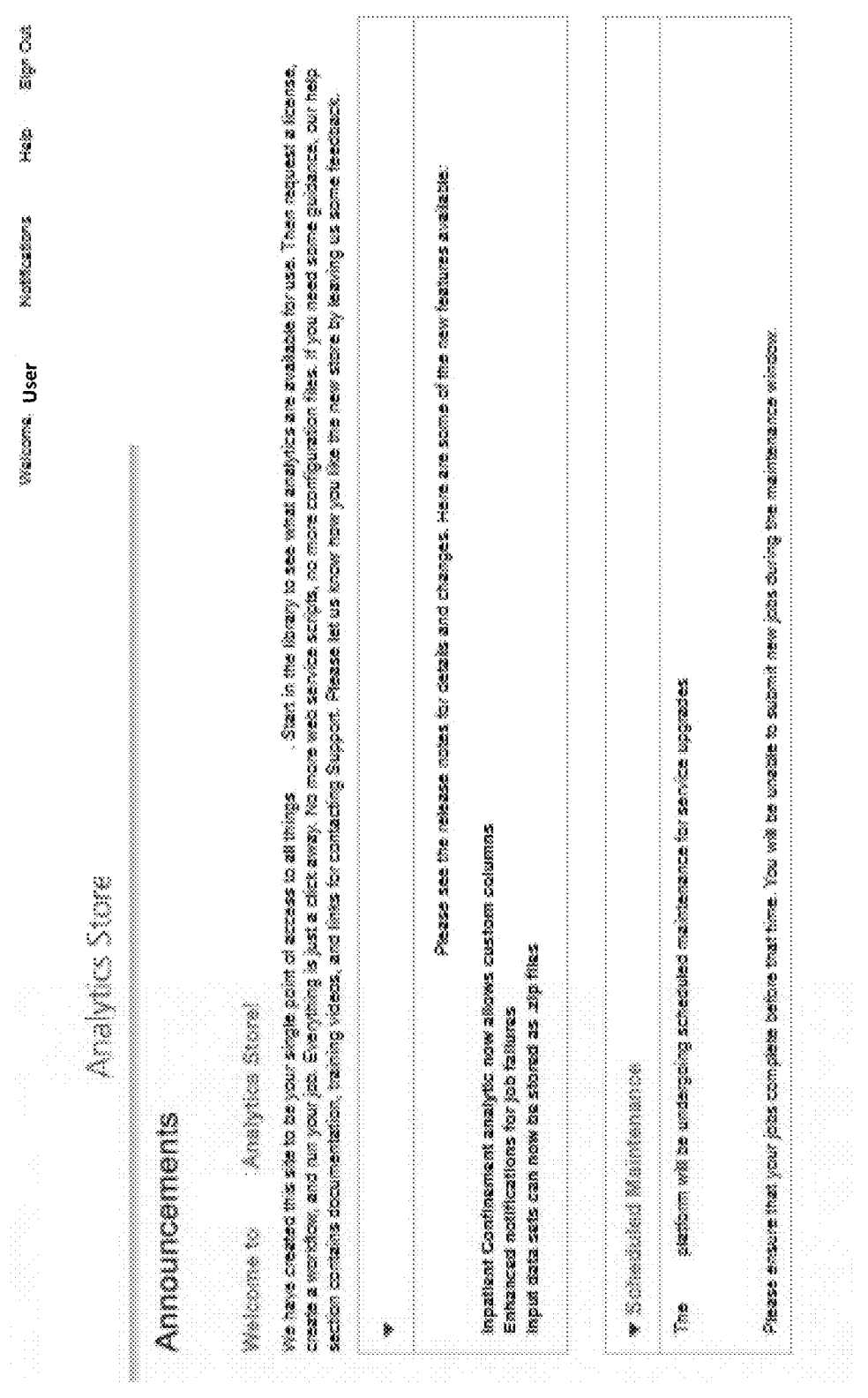

FIGS. 8-15 are example user interface presentations presented to a user of a workflow platform according to various embodiments.

DETAILED DESCRIPTION

Figure 1:
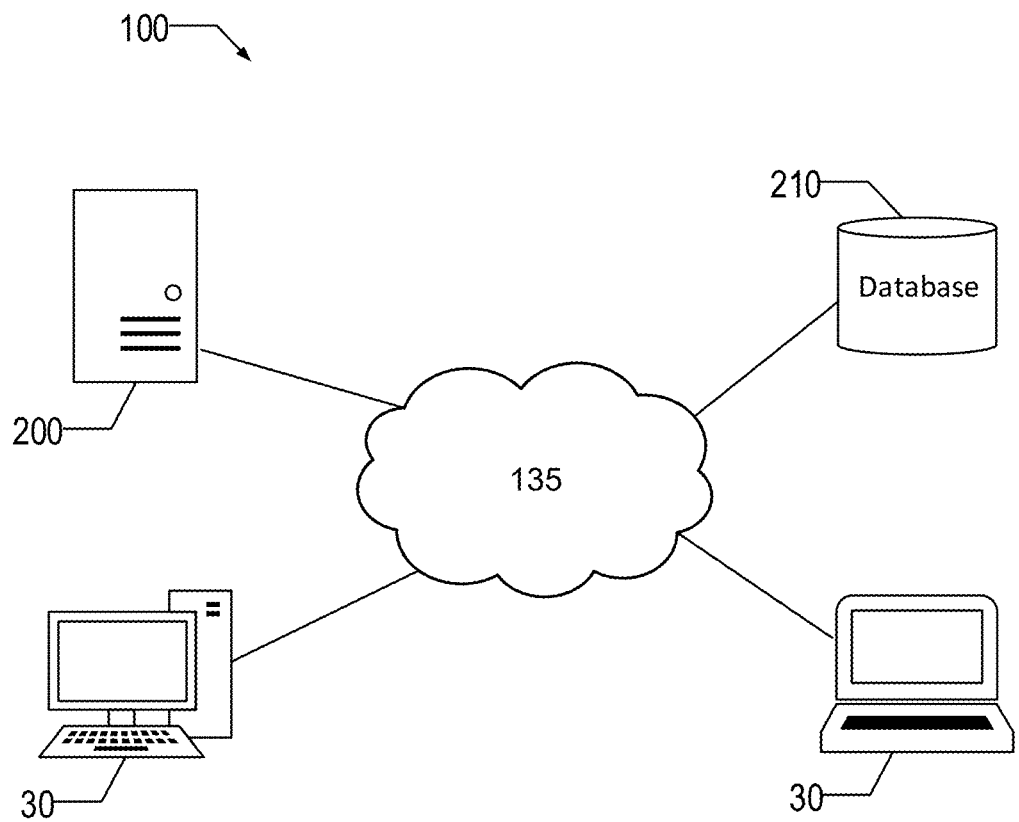
FIG. 1 shows a networked environment in which various embodiments operate.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. OVERVIEW

Various embodiments are directed to adaptable systems and methods for automatically generating composite workflows (also referred to as workflow programs) comprising a plurality of executable modules based at least in part on metadata stored in association with each of the executable modules. The composite, executable workflows may thus be embodied as modular, executable programs including a plurality of executable modules (referred to herein as the "included executable modules" of a workflow) that pass data as outputs and inputs between linked/bound executable modules that are indicated as included within a workflow based on data stored in an object created for a workflow. Required user interaction with the underlying programming process is kept to a minimum, as the workflow generation platform automatically links/binds (e.g., generates an object comprising data that makes an association between) included executable modules (e.g., via API based links) to pass appropriate data from one of the executable modules to another executable module within the composite workflow.

When establishing links (e.g., associations) between executable modules, the workflow platform retrieves metadata corresponding to each of the plurality of executable modules to be incorporated into a single workflow. This metadata identifies characteristics of both required input and generated output for each of executable modules (e.g., data size, data shape, data type, and/or the like), characteristics of the executable modules themselves (e.g., program host location, program compatibility, version number, developer, and/or the like), accessibility characteristics of particular executable modules (e.g., whether the requesting user has permission to execute the requested executable module), and/or the like. The workflow platform may identify data mismatches between involved executable modules such that the workflow platform may generate and/or provide alerts to a workflow programming developer to indicate that an interface program cannot be appropriately generated and/or to select appropriate foundational executable modules for inclusion in the included executable modules of a particular workflow that are needed to provide necessary inputs for various selected executable modules. The workflow platform is also configured to generate links configured to pass data having appropriate characteristics between the involved executable modules.

Various embodiments of the workflow platform are paired with an interactive graphical user interface such that the workflow programming interface is configured to execute various commands (e.g., to generate links) in response to user input. The graphical user interface may be configured to accept user input selecting a plurality of executable modules to be included within a single composite workflow and/or to accept user input identifying a desired data output from a workflow. In the former embodiment, the workflow platform is configured to automatically generate appropriate links in response to a user selection of a plurality of executable modules and/or to generate a workflow-specific object indicative of each of the user selected executable modules to be included within the workflow. In the latter embodiment, the workflow platform may be configured to select appropriate executable modules needed to provide the desired output, to generate needed interface programs to link the automatically selected executable modules relative to one another, and/or to generate a workflow-specific object indicative of each of the user selected executable modules to be included within the workflow.

The workflow platform may be scalable and/or adaptable as new executable modules are developed and/or added. Algorithms utilized by the workflow platform to generate links may be configured to recognize and adapt to metadata associated with any newly added executable modules such that the workflow platform enables integration with newly generated (and/or updated) executable modules without substantial modifications to the workflow itself.

Thus, workflow platforms as discussed herein, and methods of using the same avoid the need for developers to undertake manually-intensive programming tasks to build new and/or adaptive programs to provide users with a desired set of output parameters. Instead, the workflow platform is configured to link multiple existing executable modules selected from a stored set of executable modules to adapt data outputs from a first of the selected executable modules as inputs for a second of the selected executable modules.

a. Technical Problem to be Solved

Various entities managing "big data" datastores comprising massive amounts of data have developed a plurality of executable modules, programs, and/or the like that are each configured for performing some type of computation based on data stored by a particular entity. These executable modules, programs, and/or the like enrich or enhance existing data, and sometimes are utilized to make predictions about data predicted to be generated in the future. In the healthcare context in particular, various healthcare entities have developed various executable modules configured for performing computations based on patient data, and may generate data indicative of predicted future healthcare costs for various individuals and/or any risks associated with insuring certain individuals.

Over time, the plurality of executable modules, programs, and/or the like have grown to encompass executable modules, programs, and/or the like developed and/or have been implemented utilizing a plurality of coding languages, execution platforms, and/or other underlying technologies that inhibit cross-module usage of data generated thereby. Because of differences in required data input formats, execution timing, execution platform network locations, output data formats, and/or other differences between various executable modules, programs, and/or the like, data transfer among various executable modules, programs, and/or the like was generally impossible without manual intervention. Thus, historical approaches to obtaining the analytical benefits of multiple discrete executable modules, programs, and/or the like have required entirely new executable modules, programs, and/or the like to be hardcoded to include features that emulate the desired functionality of the existing executable modules, programs, and/or the like. This results in a number of additional executable modules, programs, and/or the like providing entirely redundant features as compared to other, previously existing executable modules, programs, and/or the like.

Existing programming platforms that sought to limit the growth of redundant executable modules, programs, and/or the like require substantial manual interaction with computing systems for hardcoding precise workflows encompassing a plurality of executable modules, programs, and/or the like. Partially because those individual workflow components (e.g., potential executable modules) often encompass a number of inconsistent features and/or characteristics (e.g., differences in required data input/output formats, differences in execution timing, differences in execution network locations, and/or the like), as well as differences in amounts of documentation provided with each workflow component (e.g., separate documentation, code-based comments, metadata stored within a workflow assembly platform, and/or the like) existing workflow assembly platforms are incapable of systematically/programmatically linking a plurality of existing executable modules to create a desired composite workflow providing desired data outputs based on a defined set of data inputs. Thus, generating workflows encompassing a plurality of executable modules has historically required a great detail of time-consuming manual intervention on the part of software developers.

Moreover, as new executable modules are generated (e.g., within the workflow assembly platform), various inconsistencies in internal coding configurations of those executable modules, as well as inconsistencies in the amount of documentation provided with those new executable modules prevents automatic onboarding of those new executable modules for use with workflow assembly platforms capable of developing composite workflows. Again, such difficulties require a great deal of manual interaction for completing the onboarding process for these new executable modules to enable these executable modules to be accessible via programming platforms configured for enabling these executable modules to be combined within generated workflows. Not only must these executable modules be presented to the appropriate development platform to enable access to those executable modules via the development platform, but the executable modules must be presented with appropriate manually-generated data indicative of various characteristics of the executable modules that are presented in a manner usable by the development platform.

b. Technical Solution

Various embodiments provide solutions to the above-mentioned problems via a workflow assembly platform configured to streamline the composite workflow generation process via a plurality of automated methodologies for linking previously generated executable modules to create the composite workflow. Those executable modules may be presented to the workflow assembly platform via a development portal configured to facilitate onboarding of the executable modules. The development portal of certain embodiments automatically generates necessary metadata to be associated with newly presented executable modules, and that metadata may facilitate use of those executable modules in later-generated workflows. Moreover, certain embodiments of the development portal limit presentation of executable modules that are incompatible with other executable modules, thereby ensuring compatibility between the executable modules that may later be selected by individuals for incorporation into custom workflows.

Certain embodiments of the workflow assembly platform further encompass workflow generation portals configured to generate and/or retrieve metadata associated with selected executable modules for incorporation into a workflow, such as module name, module binaries, lookup files associated with the module, version number, test data sets that may be used with the modules, target classes, input types accepted, output types produced, data parameters, required dependencies (e.g., additional modules required to provide input data to execute the module), and/or the like. The metadata may be utilized by the workflow assembly platform to identify required input data characteristics and/or output data characteristics, and to provide appropriate data links between a plurality of individual executable modules to pass output data from a first executable module to inputs of a second executable module, as needed. The workflow assembly platform may be further configured for generating and storing workflow-specific objects identifying the included executable modules and providing an acyclic graph of included executable modules of the workflow. In certain embodiments, generation of the workflow-specific object may comprise instantiation of the included executable modules (e.g., directly, or by instantiating a contextual definition of those executable modules), thereby enabling the executable modules to be utilized within the workflow. In certain embodiments, links may be established via automatically generated executable portions (e.g., implemented via APIs passing data between executable modules) and/or via automatically defined memory storage areas (e.g., portions of a physical memory storage device) enabling data to be output from a first executable module and retrieved by a second executable module.

In certain embodiments, generating metadata associated with a particular executable module may comprise automatic execution of a test data set to ascertain compatibility of the executable module with various aspects of the workflow assembly platform and/or to determine characteristics of required data inputs for the executable module and to determine characteristics of generated data outputs by the executable modules. Moreover, the workflow assembly platform may be configured to generate additional metadata associated with the executable module, such as metadata indicative of estimated runtimes, data output quality, and/or the like.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, executable modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combinations of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 provides an illustration of data connections usable within a workflow platform 100 that can be used in conjunction with various embodiments of the present invention. As shown in FIG. 1, the data connections of a workflow platform 100 may comprise one or more computing entities 200, one or more user computing entities 30, one or more networks 135, one or more databases 210, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Computing Entity

Figure 2:
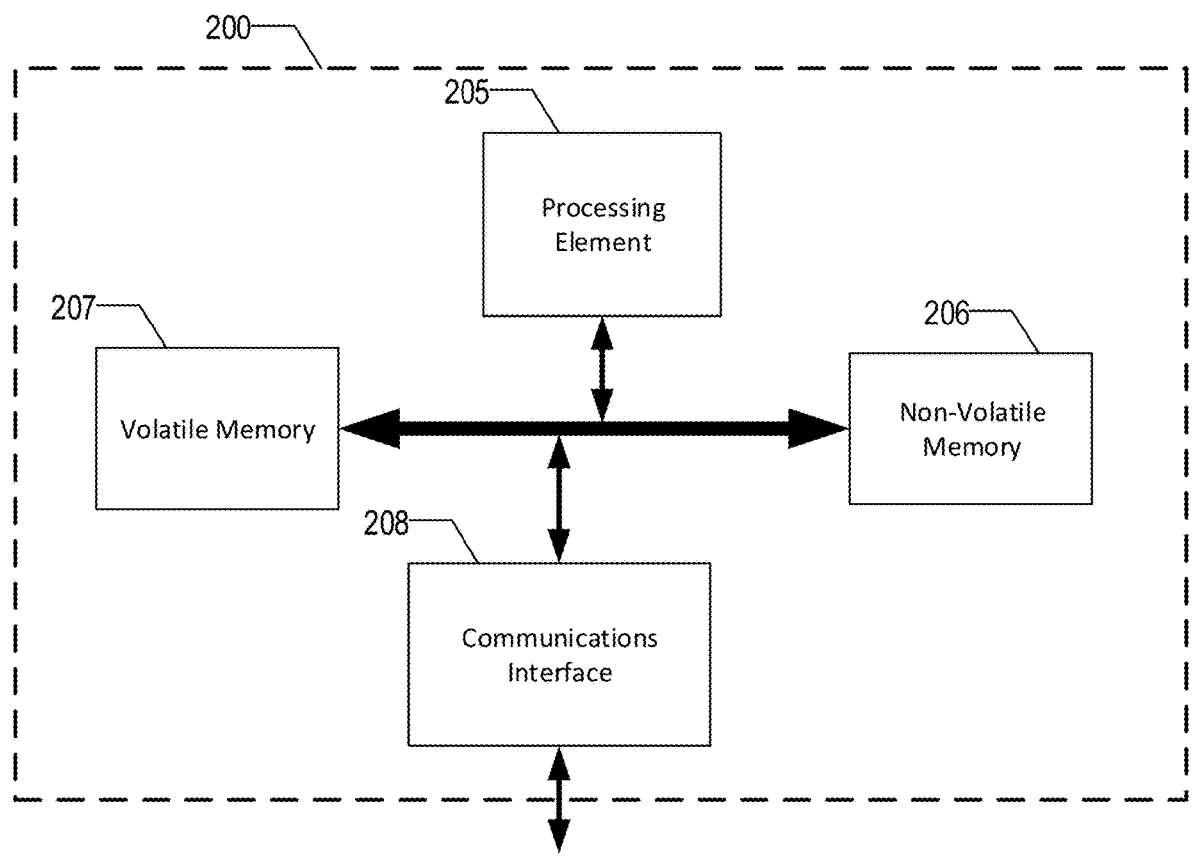
FIG. 2 shows a schematic of an example computing entity according to various embodiments.

FIG. 2 provides a schematic of a computing entity 200 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, clusters, blades, gateways, switches, processing devices, processing entities, set-top boxes, relays, routers, network access points, base stations, the like, and/or any combination of devices or entities adapted to perform the steps, functions, operations, and/or processes described herein. Such steps, functions, operations, and/or processes may include, for example, transmitting, receiving, operating on, processing, displaying, storing, determining, creating/generating, monitoring, evaluating, comparing, and/or similar terms used herein interchangeably. In one embodiment, these steps, functions, operations, and/or processes can be performed on data, content, information, and/or similar terms used herein interchangeably.

Such computing entities may be embodied as one or more workflow assembly platforms 201, one or more execution platforms 202, one or more raw data compilers (not shown), and/or the like. These computing entities will be described in greater detail in reference to FIG. 4, below.

As indicated, in one embodiment, the computing entity 200 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the computing entity 200 may communicate with other computing entities 200, one or more user computing entities 30, and/or the like.

As shown in FIG. 2, in one embodiment, the computing entity 200 may include or be in communication with one or more processing elements 205 (also referred to as processors, processing circuitry, and/or similar terms used herein interchangeably) that communicate with other elements within the computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, executable modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

Memory media 206 may also be embodied as a data storage device or devices, as a separate data store server or servers, or as a combination of data storage devices and separate data store servers. For example, as shown in FIG. 1, the memory media 206 may be embodied as one or more databases 210 (e.g., executable module store 211, other storage database 212, raw data database 212, output data database 214, and/or the like). Further, in some embodiments, memory media 206 may be embodied as a distributed repository such that some of the stored data is stored centrally in a location within the system and other data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the data required for the operation of the workflow platform may be stored. As a person of ordinary skill in the art would recognize, the data required for the operation of the workflow platform may also be partially stored in the cloud data storage system and partially stored in a locally maintained data storage system.

As discussed herein, memory media 206 stores information accessed and stored by the workflow platform to facilitate the operations of the system. As an example, the memory media 206 stores one or more executable modules presented to the workflow assembly platform via a development portal (e.g., in their entirety and/or as thin instances of executable modules that direct an executing computing entity to the hosting location of the executable module), or one or more previously generated workflows that may have been generated via an applicable workflow generation portal (e.g., in their entirety, as thin instances of an executable module that directs an executing computing entity to the host location of the workflow, as a program executable in its entirety which itself includes references to individual thin executable modules, and/or the like).

In one embodiment, the computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, executable modules, scripts, source code, object code, byte code, compiled code, interpreted code, machine code, executable instructions, and/or the like being executed by, for example, the processing element 305. Thus, the databases, database instances, database management system entities, data, applications, programs, executable modules, scripts, source code, object code, byte code, compiled code, interpreted code, machine code, executable instructions, and/or the like may be used to control certain aspects of the operation of the computing entity 200 with the assistance of the processing element 205 and operating system.

As indicated, in one embodiment, the computing entity 200 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the computing entity 200 may communicate with computing entities or communication interfaces of other computing entities 200, user computing entities 30, and/or the like.

As indicated, in one embodiment, the computing entity 200 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 200 components may be located remotely from other computing entity 200 components, such as in a distributed system. Furthermore, one or more of the components may be aggregated and additional components performing functions described herein may be included in the computing entity 200. Thus, the computing entity 200 can be adapted to accommodate a variety of needs and circumstances.

b. Exemplary User Computing Entity

Figure 3:
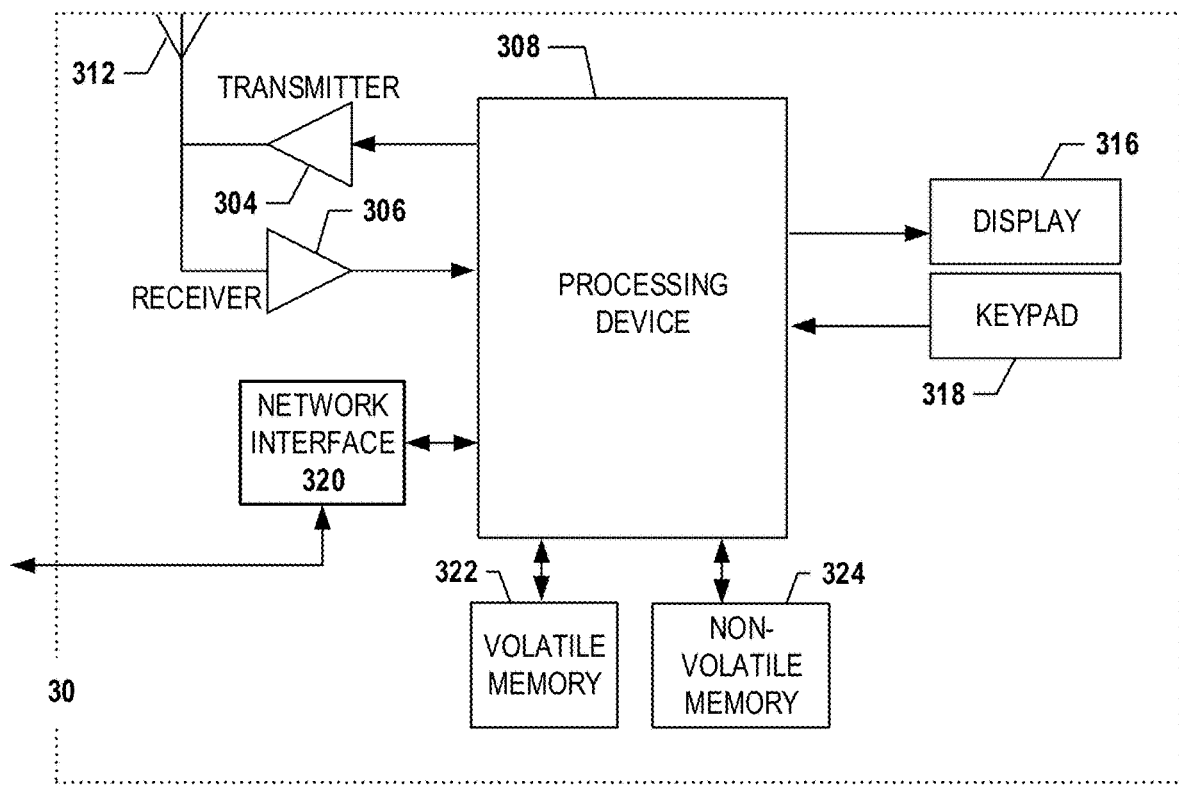
FIG. 3 shows an example user computing entity according to various embodiments.

FIG. 3 provides an illustrative schematic representative of user computing entity 30 that can be used in conjunction with embodiments of the present invention. The user computing entity 30 may be usable by any of a variety of "users," which may encompass one or more individuals, companies, organizations, entities, departments within an organization, representatives of an organization and/or person, and/or the like. These users may have various roles, such as administrative users controlling access to various aspects of the workflow platform 100 and/or controlling the integration of various features of the workflow platform 100, developers associated with user-generated executable modules (e.g., providing executable modules via the development portal), developers associated with selecting previously-generated executable modules for incorporation into a workflow (e.g., selecting individual executable modules for incorporating into associated workflows built via the workflow generation portal), end-users seeking the data output from a previously generated workflow, and/or the like.

As shown in FIG. 3, a user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a computing entity 200, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing device 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, executable modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 200 position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface device comprising one or more user input/output interfaces (e.g., a display 316 and/or speaker/speaker driver coupled to a processing element 308 and a touch presentation, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as presentation savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, executable modules, scripts, source code, object code, byte code, compiled code, interpreted code, machine code, executable instructions, and/or the like to implement the functions of the user computing entity 30.

c. Exemplary Networks

In one embodiment, any two or more of the illustrative components of the architecture of FIG. 1 may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. EXEMPLARY SYSTEM OPERATION

Figure 4:
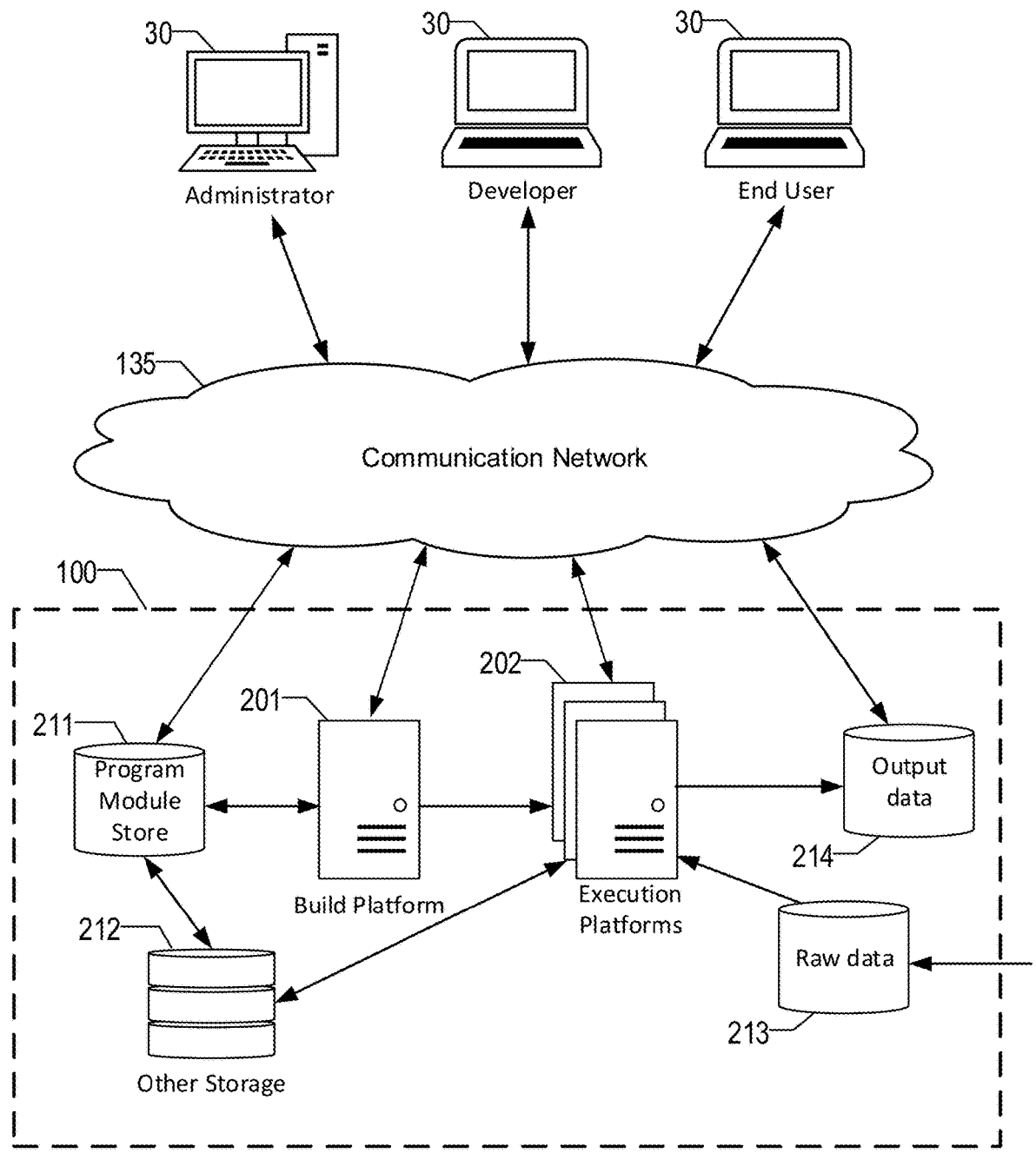
FIG. 4 shows an example workflow generation system according to various embodiments.
Figure 5A:
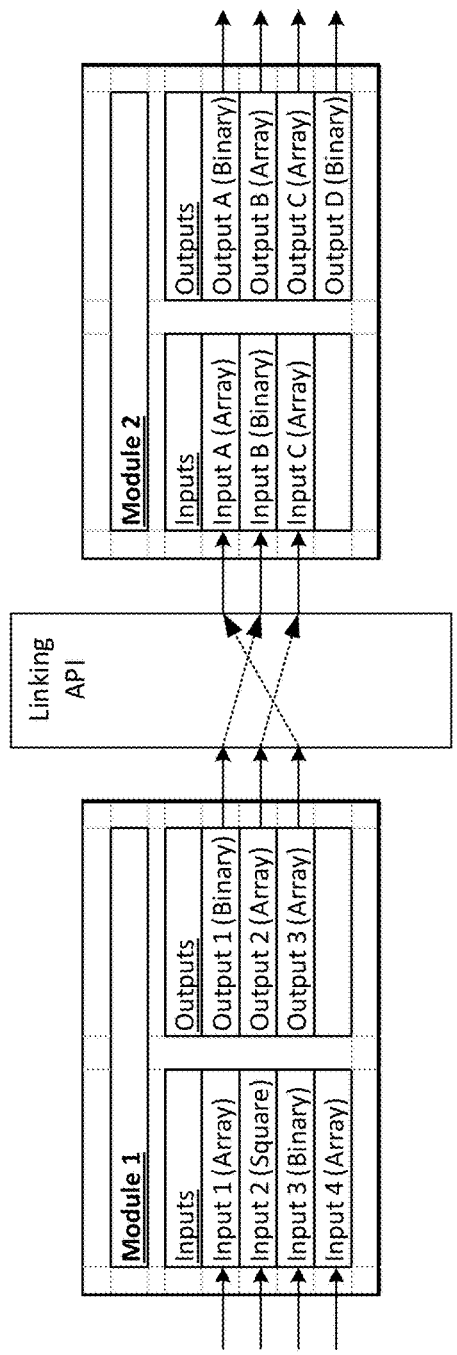
FIGS. 5A-5B illustrate example data flows within a workflow according to various embodiments.
Figure 5B:
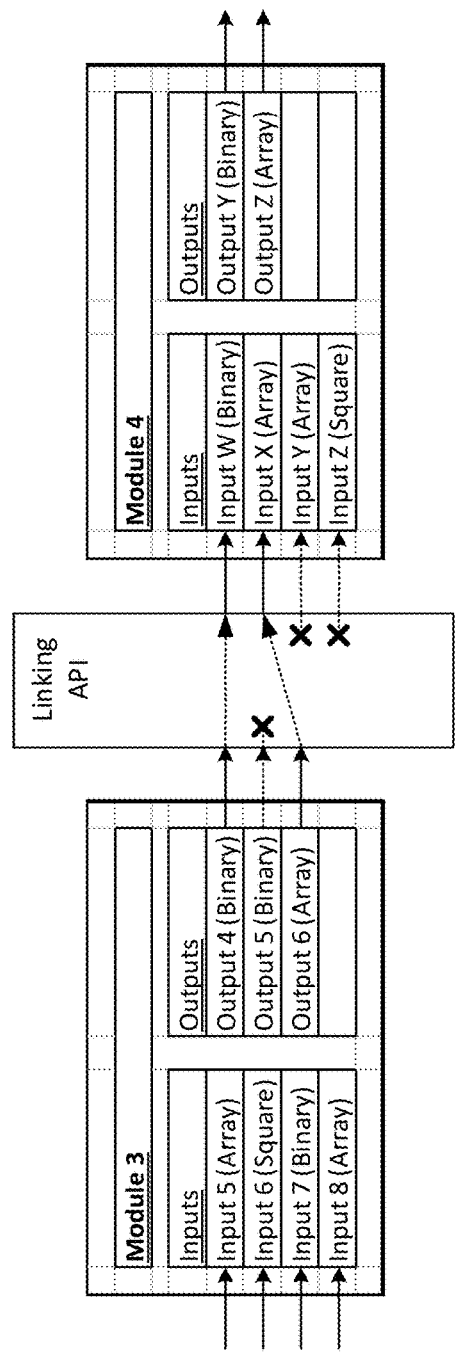
Figure 6:
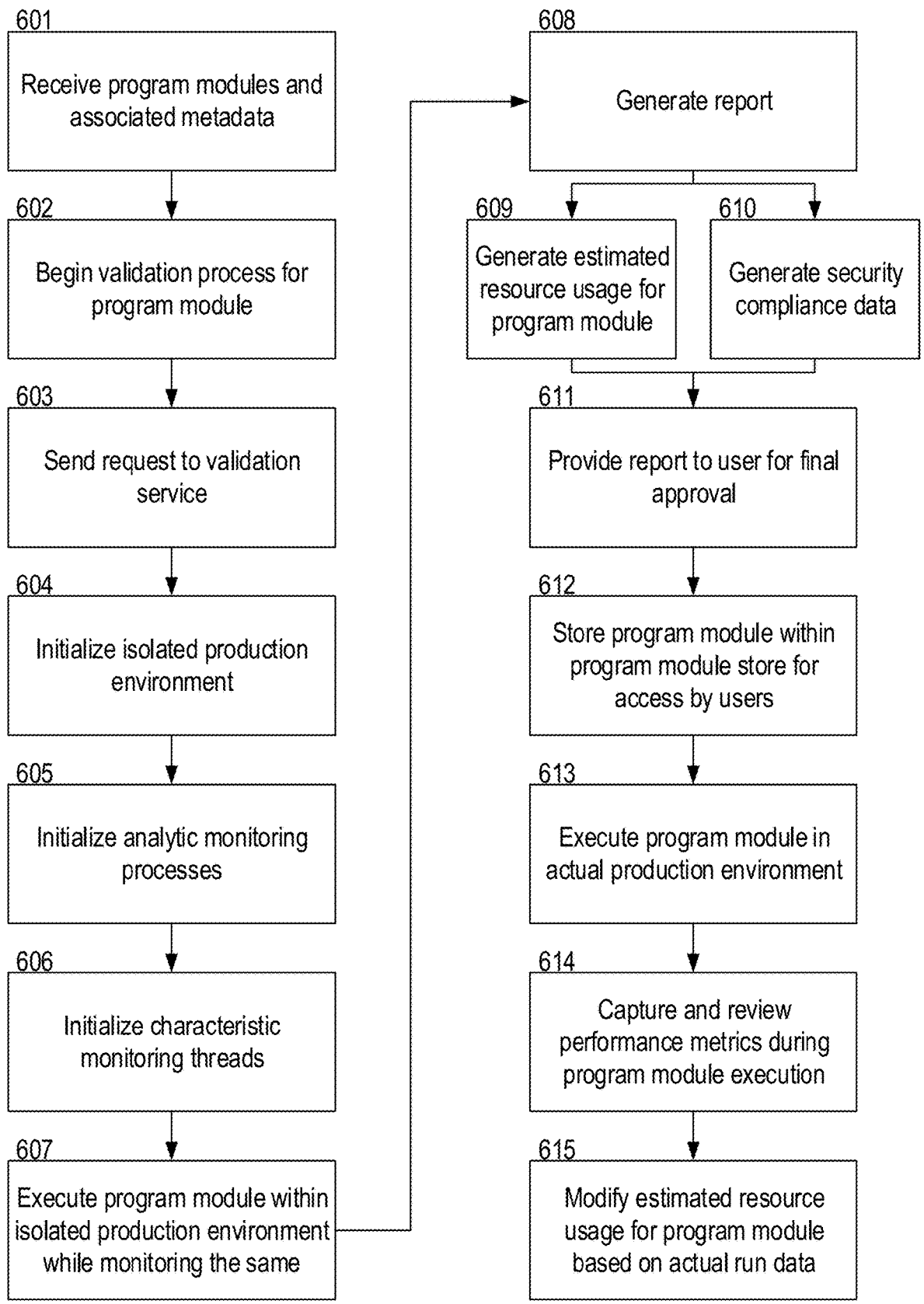
FIG. 6 is a flowchart illustrating example executable module verification steps of a workflow assembly platform according to one embodiment.
Figure 7:
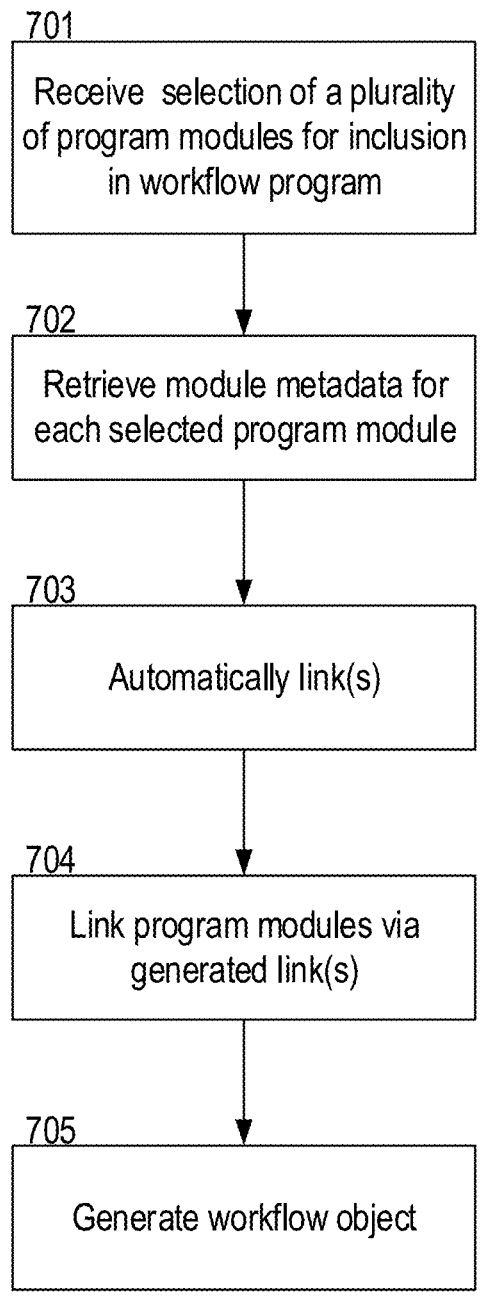
FIG. 7 is a flowchart illustrating example execution steps of a workflow assembly platform according to one embodiment.

Example data flows will now be described with reference to FIGS. 4-7. FIG. 4 illustrates a schematic diagram of data flows between various computing entities of the workflow platform, FIGS. 5A-5B schematically demonstrate the functionality of automatically generated interface programs as discussed herein, and FIGS. 6-7 are flowcharts illustrating various steps, operations, and/or processes performed by a workflow assembly platform 201 of embodiments discussed herein.

The workflow platform 100 is configured to generate executable composite workflows comprising a plurality of individual executable modules, and accordingly a plurality of executable modules are generated prior to implementation of various embodiments as discussed herein. In certain embodiments, executable modules are embodied as independently executable computer programs configured to consume some input data (e.g., raw data received from raw data database 213) and to generate some output data. Executable modules may encompass programs based on any of a variety of programming languages, such as Java, C++, SAS, SQL, R, Python, and/or the like. Executable modules may, in certain embodiments, encompass machine learning components and/or artificial intelligence components, and/or the executable modules may be generated based on machine-learning and/or artificial intelligence, for example by a separate computing program having machine learning and/or artificial intelligence components. As non-limiting examples, executable modules may be configured to receive patient data associated with a healthcare provider, and to generate various patient-related (or population related) analytical data based at least in part on the data input. For example, patient data indicative of a plurality of claims generated on behalf of a particular patient may be analyzed and grouped into discrete episodes of care via a particular executable module, and other modules may be configured for performing one or more data analyses on the patient data based on characteristics of generated episodes of care. As another example, an executable module may be configured for executing specifically configured rules based on patient data to identify likely gaps in care. As yet another example, an executable module may be configured for intaking provider-specific data and executing one or more algorithms to determine whether a provider is adhering (or the degree to which the provider is adhering) to Evidence Based Medicine and/or another desired procedural consideration. Executable modules may be configured for examining patient data to score providers and determine Star ratings for providers and/or Healthcare Effectiveness Data and Information Set (HEDIS) ratings for those providers. Other executable programs may be configured for executing a predictive model to determine risks of opioid abuse for particular populations and/or individuals.

Executable modules may be generated via any of a variety of mechanisms. For example, developers may generate executable modules (e.g., via a user computing entity 30) and/or various executable modules may be automatically generated. In certain embodiments, these executable modules may be generated with a defined object/data model to ensure inter-module compatibility and/or to enable a workflow assembly platform and/or an execution platform to verify the availability of particular module features (e.g., dependent libraries of a particular executable module).

The executable modules may be stored via an executable module store 211 as indicated in FIG. 4, and may be published for display via an interface associated with the workflow generation portal, such that users may select one or more of the published executable modules for inclusion in a workflow. As discussed herein, these executable modules may be directed through a testing protocol to ensure compatibility with the workflow assembly platform and/or to ensure inter-module compatibility prior to storage within the executable module store 211 and/or prior to publication via the described interface. The executable module store may be embodied as a database storing various executable modules as fully compiled, operable computing programs hosted via the executable module store 211, as thin computing programs comprising network calls to one or more cloud-based executable computer programs operating via other storage databases 212 (either internal to the workflow platform 100 or external to the workflow platform 100), and/or the like. The executable modules may be stored within the executable module store 211 together with metadata as discussed herein and/or in association with an automatically populated index comprising metadata associated with each of the executable modules stored therein. In addition to the metadata discussed herein that may be associated with each of a plurality of executable modules, the executable module store 211 may store a publication indicator in association with the executable modules which is indicative of whether data indicative of the executable module should be displayed via the interface of the workflow generation portal to enable selection of the executable module for inclusion in a workflow program. In certain embodiments, executable modules may be developed and/or generated on a remote computing entity (e.g., a developer's user computing entity 30) and transferred via the communications network 135 for storage via the executable module store 211 and/or another storage location 212. The executable module store 211 may be further configured to facilitate update processes for existing executable modules stored therein by enabling existing executable modules to be easily replaced and/or updated with optimized versions of a particular executable module.

Moreover, various executable modules may be generated by and/or to include one or more machine learning and/or AI aspects. In certain embodiments, a plurality of versions of the various machine learning and/or AI related executable programs may be provided for storage via the executable module store 211 simultaneously, with certain portions of the executable modules being modified (e.g., automatically identified and/or modified via machine learning and/or AI configurations) to continuously test potential changes to further optimize the operation of various executable programs. In such embodiments, only a subset of all of the versions of a particular executable module may be published for use simultaneously, thereby enabling other, non-published versions to be tested and/or modified to improve optimization.

a. Executable Module Verification

Certain embodiments may store only verified and/or approved executable modules within an executable module store 211, such that those executable modules that may be selectably included in composite workflows have been verified to ensure functionality and/or to satisfy various data leakage requirements and/or other security or privacy concerns. FIG. 6 illustrates a flowchart of an example verification process that may be utilized for verifying executable modules prior to storing the same within an executable module store 211 and/or publishing data regarding the executable modules to a user interface. Although the following discussion notes that the verification steps, operations, and/or processes may be performed by the workflow assembly platform 201, it should be understood that other computing entities in communication with the executable module store 211 may execute one or more of the steps, operations, and/or processes discussed herein.

As shown at FIG. 6, executable modules may be provided to the workflow assembly platform (e.g., by module developer) via a developer portal. In addition to the binary (e.g., executable module), corresponding metadata may also be provided. The metadata may include the module name, version number, developer/author, data indicative of storage locations accessed by the module (whether internal, temporarily created, and/or external), such as particular lookup files, data indicative of storage locations saved to by the module (whether internal, temporarily created, and/or external), target class/method, input data format and type, output data format and type, and/or the like (as indicated at step/operation 601). In various embodiments, the workflow assembly platform 201 may be configured to determine whether the provided metadata indicates that the executable module is compatible with the workflow assembly platform 201 (e.g., whether the workflow assembly platform 201 is capable of compiling the executable module), the execution platform 202 (e.g., whether the execution platform 202 is capable of reading and/or executing the executable module, whether the execution platform 202 is capable of generating an appropriate link that may interact with the executable module), and/or other executable modules (e.g., whether the executable module may be linked with other executable modules), and the workflow assembly platform 201 may reject the executable module from further consideration if it is determined to be incompatible. In certain embodiments, an interface configured for accepting executable module submissions may be configured to accept only executable modules that are compatible with the workflow assembly platform 201 and/or execution platform 202 to prevent unauthorized, unapproved, or otherwise incompatible executable modules from being submitted.

Assuming the executable module is determined to be compatible with the workflow assembly platform 201, the execution platform 202, and/or other executable modules, the workflow assembly platform 201 begins the validation process, as indicated at step/operation 602. The validation process may be performed in association with a verification service, and accordingly the workflow assembly platform 201 may be configured to send a request to the verification service as indicated at step/operation 603. Because executable modules being submitted for verification are unverified at this stage, the verification steps, operations, and/or processes may be performed in entirely isolated environments that may prevent the executable module from interacting with the workflow module build functionalities and/or workflow execution functionalities as discussed herein. Thus, as a part of the verification process, the workflow assembly platform 201 initializes an isolated production environment for testing and/or verification of various attributes of the executable module, as indicated at step/operation 604. In certain embodiments, the isolated production environment may be embodied as a partitioned portion of a storage area on the workflow assembly platform servers, a physically discrete server or other computing device, and/or the like. Moreover, the workflow assembly platform 201 may be configured to provide relevant data to the isolated production environment for testing of the executable module, and may subsequently disconnect the isolated production environment from network communications to prevent unauthorized data leakage from the production environment to external systems.

In various embodiments, the isolated production environment may be associated with analytic monitoring processes, (e.g., Java-based analytic monitoring processes) that may be utilized to monitor various execution characteristics associated with the processing module. This analytic monitoring process may be initialized, as indicated at step/operation 605, to monitor the execution of the processing module while executing a test data set. The analytic monitoring process may cause one or more threads to be initialized, as indicated at step/operation 606, wherein each thread may be configured for monitoring a different attribute of the executing executable module. For example, one or more threads may be initialized for monitoring respective aspects of resource usage, such as CPU usage, memory usage, and/or the like. Various threads or other aspects of the analytic monitoring process may be utilized to monitor network connections (or network connection attempts), class loading processes, file access (or attempts to access files), and/or the like.

As indicated at step/operation 607, the executable module may be executed with a test data set while the various threads and/or other analytic monitoring processes may be utilized to monitor characteristics, behavior, and/or the like of the executing executable module. For example, the testing may identify whether the executable module attempts to access one or more data sets that are not permissible for executable module access, attempts to establish network connections with unauthorized third party systems that may result in undesirable data exposure and/or leakage outside of the workflow assembly platform 201 and/or execution platform 202, and/or the like. Moreover, the testing may be utilized to establish the amount of processing resources required for executing the executable module, as well as an estimated time to complete the execution of the executable module.

As indicated at step/operation 608, a report may be generated including automatically populated data summarizing the results of the test. The report may be utilized to calculate dependent attributes of resource usage, such as an estimated time and/or cost for executing a particular executable module with a real data sets, as indicated at step/operation 609, and to provide specific data indicative of particular security compliance results, as indicated at step/operation 610. The report may be presented to a user (e.g., a system administrator) for final approval, as indicated at step/operation 611, before storing the executable module within the executable module store 211, as indicated at step/operation 612. However, upon determining that the executable module presents security risks, has one or more flaws rendering the executable module inoperable, does not include complete user interface content, and/or the like, the executable module is not stored in the executable module store 211, and one or more alerts may be provided to a user. In certain embodiments, metadata indicative of the presence of the unstored executable module may be retained (e.g., stored in the executable module store 211) and alerts may be provided to the developer indicating that the previously presented executable module was not stored in the executable module store 211.

In certain embodiments, the executable modules may be stored in the executable module store 211 together with automatically generated metadata resulting from the verification process, such as an initial runtime estimate, initial resource usage requirement estimates, and/or the like. Moreover, data associated with the executable modules stored within the executable module store 211 may later be published and made available for display via a user interface displayable via a workflow generation portal to enable the approved and published executable modules to be selected for inclusion in a workflow.

In certain embodiments, the results of the verification process, including data indicative of data utilized by the executable module, data generated by the executable module, data storage locations associated with the executable module, and/or the like may be utilized to generate metadata to be associated with the executable module. Accordingly, the initial compatibility check discussed in reference to step/operation 601 above ensures that the executable module comprises appropriate components to enable automated determinations of the data types utilized and/or data types generated by the executable module. The executable module may then be approved for use in workflows and include its corresponding metadata.

If the executable module does not receive final approval, the executable module may be rejected, and data indicative of the rejection may be provided to the developer or other user that initially provided the executable module for review.

Moreover, as indicated at steps/operations 613-615, similar analytic monitoring may be performed when executing the executable module with real data, as indicated initially at step/operation 613. Performance metrics may be captured as indicated at step/operation 614, which may be indicative of real-time determined resource usage and/or execution time, and the workflow assembly platform 201 may update metadata stored with the executable module to provide more accurate estimates of the run time and/or resource usage for the executable module as indicated at step/operation 615.

b. Workflow Assembly Platform Operation

As indicated in FIG. 4, the executable module store 211 is in communication with a workflow assembly platform 201. The workflow assembly platform 201 is configured for generating one or more workflows by combining a plurality of executable modules (e.g., a plurality of executable module instances) and building links between these executable modules such that data flows appropriately between and/or among various linked/bound executable modules. In certain embodiments, these links may be embodied as Application Program Interface (API) components configured to receive and provide data to various executable modules such that other executable modules may retrieve and intake the data for execution of those other executable modules.

Figure 10:
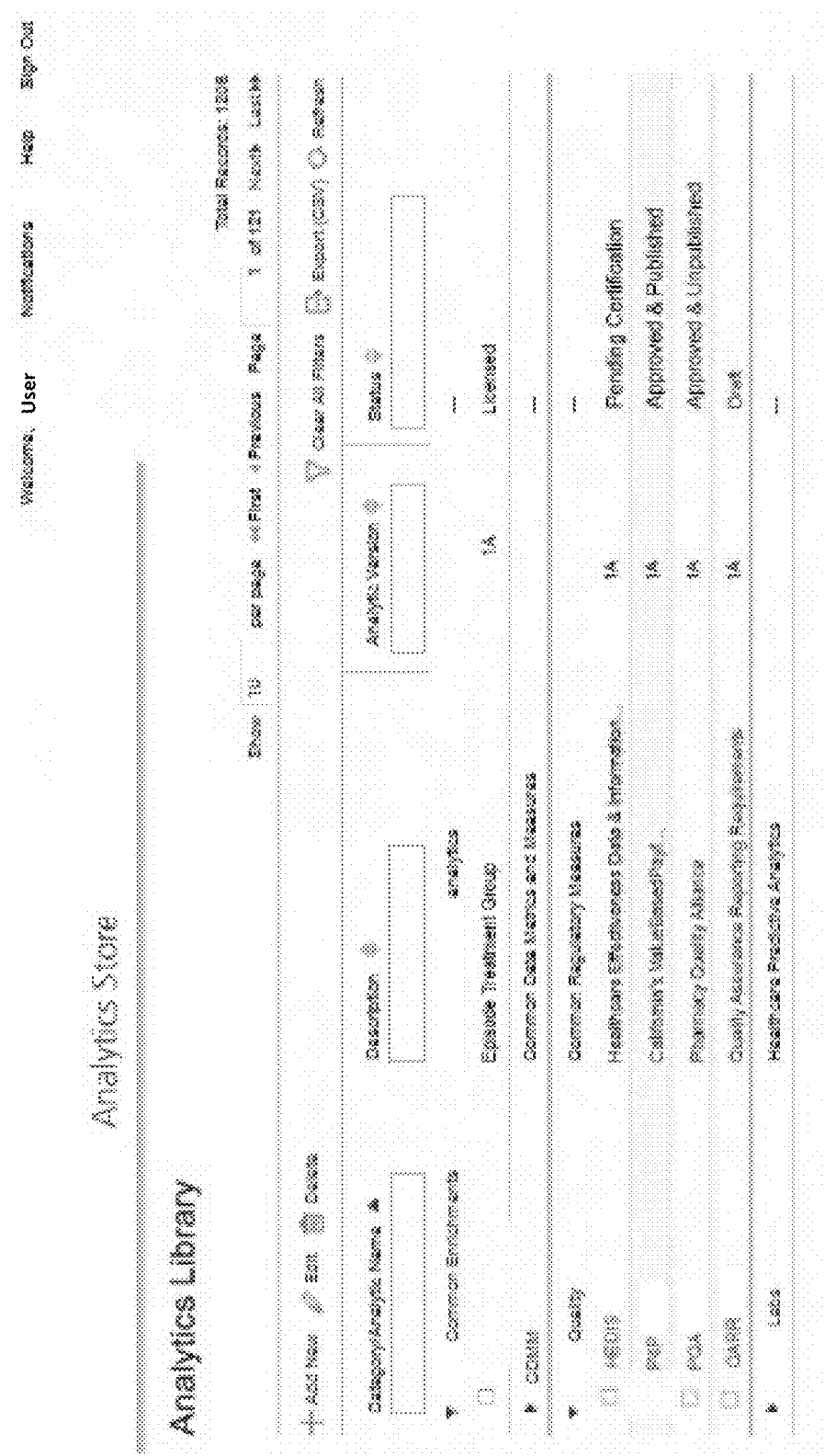

The workflow assembly platform 201 may store and/or be associated with a graphical user interface accessible to user computing entities 30 (e.g., via communications network 201) as a part of a workflow generation portal. Example graphical user interface presentations are shown at FIGS. 8-15. In certain embodiments, the graphical user interface presentations are configured to accept user input selecting one or more executable modules published and displayed via a graphical user interface (as shown in FIG. 10) to incorporate into a newly designed workflow, to accept user input indicative of desired data outputs from a newly designed workflow, to accept user input of various characteristics of a newly designed workflow, and/or the like. The graphical user interface comprises a listing and/or other grouping of selectable graphical user interface elements associated with each of the selectable executable modules (e.g., published executable modules) stored in the executable module store 211. Moreover, the graphical user interface may be dynamically updating in certain embodiments, such that the listing of available executable modules provided via the graphical user interface may change as one or more executable modules are selected, such that only other executable modules that are compatible with those already selected are shown. However, in certain embodiments the graphical user interface may be configured to display both compatible and incompatible executable modules, regardless of the executable modules already selected for inclusion within a workflow. The graphical user interface may be further configured for displaying only those executable modules for which a particular user has permission to access, or the graphical user interface may be configured for displaying all executable modules, and may provide other indications of whether a particular executable module is available to a user based at least in part on the user's permissions.

These selectable user interface elements may comprise buttons, hyperlinks, dragable graphical interface objects, and/or the like. As yet other examples, the various executable modules may be selectable for inclusion in a built workflow by user input denoting (e.g., via a character string provided by the user) the identity of one or more executable modules to be included in a built workflow.

In certain embodiments, the graphical user interface associated with the workflow generation portal may additionally comprise a build window illustrating the various selected executable modules included within the generated workflow. In certain embodiments, the build window may be text-based, providing a textual indication of the various executable modules included in the workflow. However, it should be understood that in certain embodiments the build window may comprise a plurality of interface objects (e.g., shapes) graphically depicting the various executable modules included within the workflow.

Moreover, the graphical user interface may comprise one or more status windows. These windows may be a permanent affixture within the graphical user interface, or the status windows may appear (e.g., as pop-ups) on an as-needed basis to provide informational prompts to a user. For example, a status window may provide information and/or alerts indicating that one or more executable modules cannot be successfully linked/bound within the workflow (e.g., the needed data input is unavailable, an additional executable module is needed, and/or the like). As yet another example, a status window may provide information indicating if/when a workflow has been successfully built (e.g., compiled, and/or when an object for the workflow has been generated and/or stored) and is ready for execution (e.g., by transmitting the workflow to one or more execution platforms 202).

FIG. 7 provides a flowchart illustrating various steps performed by a workflow assembly platform 201 according to various embodiments. As mentioned here, the workflow assembly platform 201 is configured to assemble workflows including a plurality of executable modules selected from the executable module store 211 (e.g., selected from those executable modules published and thereby displayed via a graphical user interface), as indicated at step/operation 701. In certain embodiments, assembly of the workflows may comprise steps for generating an executable object comprising data indicative of the included executable modules (e.g., executable module instances) and/or one or more links (e.g., APIs) configured for passing data between included executable modules in accordance with an acyclic graph indicated by the contents of the workflow object. The acyclic graph may provide data indicating an order for execution of the included executable modules and/or data indicating how data is to be passed between executable modules. The executable module store 211 may comprise data indicative of each of a plurality of executable modules, as well as metadata associated with each of the plurality of executable modules. As discussed herein, the binaries of the executable modules may be stored locally within the executable module store 211, or the executable modules may be stored/hosted on a separate storage location 212, which may be internal to the workflow platform 100 or external to the workflow platform 100. In the latter embodiments, the executable module store 211 comprises executable data that directs program requests to the appropriate separate storage location 212 upon selection of a particular executable module. Moreover, as discussed herein, metadata associated with various executable modules may comprise machine-readable and/or textual data be indicative of (1) a module name, (2) foundational dependencies of the module (e.g., required foundational modules that provide required input for the module), (3) ordering or required grouping requirements with other executable modules, (4) module binaries, (5) lookup files associated with the module, (6) a version number associated with the module, (7) test data (e.g., a storage location of a test data file) for the module, (8) input schema requirements for the module, (9) documentation indicative of output data generated by the module (e.g., including output schema), (10) wireframes associated with the module, (11) a developer/author of the executable module, (12) allowed configuration parameters, (13) governance data indicative of the status, access levels, history, and/or promotion of the executable module to production readiness, (14) performance information, and/or the like. Moreover, various aspects of the metadata may be provided upon generation of an executable module (e.g., based at least in part on user input) and/or various aspects of metadata may be automatically generated, for example during testing methodologies as discussed herein.

The selection of executable modules for inclusion within a workflow may be made via a user input received via a graphical user interface displaying a plurality of published executable modules as discussed herein and/or selections of individual executable modules may be made automatically by the workflow assembly platform 201. In certain embodiments, the workflow assembly platform 201 may receive desired workflow parameters, such as a desired data output (e.g., data output size, data output type, data output contents, data output format, and/or the like), designated input data sources, and/or the like, and the workflow assembly platform 201 may select one or more appropriate executable modules to satisfy the workflow parameters. For example, the workflow assembly platform 201 may consider characteristics of the various executable modules, such as metadata associated with each of the plurality of executable modules to determine one or more appropriate combinations of executable modules to generate a workflow satisfying the provided parameters. The workflow assembly platform 201 may be configured for automatically generating an executable module order within a workflow indicative of a required order in which executable modules are to be executed in certain embodiments. For example, as discussed herein, certain executable modules generate, as output, data required as input for other executable modules, and accordingly the workflow assembly platform may be configured for generating an execution order for the execution modules to ensure all included executable modules receive appropriate data input for proper execution.

As yet another example, the workflow assembly platform 201 may generate one or more workflows entirely autonomously, for example based on one or more machine-learning algorithms, one or more artificial intelligence algorithms, and/or the like (e.g., executing via the workflow assembly platform 201 or via a separate computing entity in communication with the workflow assembly platform 201). Thus, without explicit user prompting, the workflow assembly platform 201 may generate one or more workflows to provide data output to various machine learning and/or artificial intelligence computing entities.

Upon selection of the executable modules for inclusion in a workflow, the workflow assembly platform 201 retrieves module metadata for each of the selected executable modules, as indicated at step/operation 702. As discussed herein, the module metadata may comprise data indicative of various program characteristics, such as the module name, the data input structure/format and data input types needed for proper functionality of the executable module, the data output structure/format and data output types generated by the executable module, expected input data locations (e.g., in an array, a first column is expected to contain user identifiers, and a second column is expected to contain a sum of all costs incurred for each user identifier), generated output data locations, and/or the like. FIGS. 5A-5B illustrate example executable module characteristics that may be reflected in the corresponding module metadata for four different executable modules 501. For example, the "Module 1" executable module 501 requires four inputs for proper functionality. Those four inputs comprise: Input 1 (in the form of an array), Input 2 (in the form of a square array), Input 3 (a binary input), and Input 4 (in the form of an array). Module 1 generates three outputs: Output 1 (a binary output), Output 2 (in the form of an array) and Output 3 (in form of an array). Similar information is illustrated for the Modules 2-4 executable modules 501 illustrated in FIGS. 5A-5B. The workflow assembly platform 201 may be configured for generating and/or storing an object reflective of the generated workflow (and/or a directed acyclic graph of executable modules included in the same), including data indicative of the various executable programs included therein. In certain embodiments, the workflow assembly platform 201 instantiates the one or more executable programs for inclusion within the generated workflow (e.g., via Java reflection, by instantiating context definitions of various executable modules generated via a dependency injection tool, such as Spring, and/or the like)

Beginning at step/operation 703, the workflow assembly platform 201 automatically builds appropriate links between the data outputs from one module into the data inputs of another module to generate a complete workflow. Again, FIGS. 5A-5B schematically illustrate links 510 (e.g., in the form of linking APIs) linking the outputs of executable modules 501 to inputs of other executable modules 501. In certain embodiments, the links 510 may comprise one or more temporary storage locations for storing intermediate output of various executable modules, thereby enabling other executable modules to retrieve the intermediate output and to utilize the intermediate output as input to those other executable modules as needed. Moreover, generated APIs or other linking configurations thus identify the temporary storage locations utilized for the intermediate output, such that the intermediate output may be properly provided to other executable modules within a directed acyclic graph of executable modules for a particular workflow. Specifically, as shown in FIG. 5A, the linking API 510 is configured to accept, as inputs, the outputs of the executable module 501 entitled "Module 1" (e.g., by storing the data within a temporary storage location). The outputs of the Module 1 executable module may be stored temporarily in a memory storage area to be retrieved by Module 2 (e.g., upon receipt of a trigger signal provided from the linking API to Module 2 indicating the presence of data in the memory storage area).

Although not illustrated, the link 510 may be configured to accept, as inputs, the output data from a plurality of separate executable modules 501—e.g., it interfaces between executable modules. For example, a first executable module 501 may provide a first set of data to the link 510, and a second executable module 501 may provide a second set of data to the link 510. The link 510 may then prepare the data from both of the executable modules 501 for presentation to one or more additional executable modules 501 as inputs thereto. Likewise, the link 510 may be configured to provide, as output therefrom, input data for a plurality of executable modules 501. For example, the link 510 may provide a first data set to a first executable module 501 and a second data set to a second executable module 501. For clarity, the number of input executable modules 501 need not match the number of output executable modules 501 for the link 510. Moreover, although not illustrated, a single workflow module may comprise a plurality of links 510 generated by the workflow assembly platform 201. For example, output from a first executable module 501 may pass through a first link 510 to be provided as input to a second executable module 501, and the output of the second executable module 501 may pass through a second link 510 to be provided as input to a third executable module 501. Thus, various links 510 may be provided as serial API interfaces between a plurality of executable modules 501.

In various embodiments, workflow assembly platform 201 may identify unresolvable differences (e.g., input errors and/or output errors) between data types generated from certain executable modules 501 and needed for other executable modules 501. The workflow assembly platform 201 may be configured to identify such unresolvable differences based on metadata associated with the selected executable modules 501, such that these errors may be resolved before executing the constructed workflow. FIG. 5B illustrates an unsuccessful match between the Module 3 executable module 501 and the Module 4 executable module 501 as identified by the workflow assembly platform 201. As illustrated in FIG. 5B, the workflow assembly platform 201 identifies appropriate matching data types between Output 4 of the Module 3 executable module 501 and Input W of the Module 4 executable module 501, and between Output 6 of the Module 3 executable module 501 and Input X of Module 4. However, the workflow assembly platform 201 determines that the Module 3 executable module 501 does not provide the proper data outputs to satisfy all of the input requirements of the Module 4 executable module 501 (and any raw data sources likewise do not provide the proper inputs for the Module 4 executable module 501). Specifically, Module 4's Input Y and Input Z may be identified as hanging inputs (indicative of input errors) that cannot be satisfied by the output of the Module 3 executable module 501. Again, such matches and/or hanging inputs may be identified based at least in part on metadata associated with each of the plurality of executable modules 501 indicating the required input for execution of those executable modules 501 as well as the output generated by other executable modules 501. In such instances, the workflow assembly platform 201 may generate an alert to be presented to a user (e.g., via a graphical user interface provided via a user computing entity 30). In certain embodiments, the workflow assembly platform 201 may automatically select one or more additional executable modules 501 from the executable module store 211 to satisfy the hanging inputs of the incomplete workflow and may utilize a link with the additional executable modules 501 to ensure proper functionality of the workflow. These additional executable modules 501 may be automatically added to the workflow, or they may be provided as suggestions to a user (e.g., via the graphical user interface) that may be selected for inclusion within the workflow. In certain embodiments, the metadata of various executable modules 501 identify particular foundational executable modules 501 from which the selected executable module 501 depends. Such foundational executable modules 501 generate data outputs required to be utilized as data input for depending executable modules 501. Accordingly, upon selection of a particular executable module 501 for inclusion in a workflow that has metadata identifying an associated foundational executable module 501, the workflow assembly platform 201 may be configured to automatically add the foundational executable module 501 to the workflow. Moreover, the workflow assembly platform 201 may be configured to automatically order the selected executable module 501 and its corresponding foundational executable module 501 such that the foundational executable module 501 executes prior to the selected executable module 501, such that the foundational executable module 501 provides needed input for the selected executable module 501 to execute properly.

With reference again to FIG. 5B, the interface program 510 may also determine that Output 5 does not have an appropriate matching input for the Module 4 executable module 510. While this may not prevent the workflow from functioning properly, the workflow assembly platform 201 may be configured to generate an output error alert and/or request user input providing instructions for disposing of the Output 5 generated by the Module 3 executable module 501. The Output 5 may pass through to the final output of the workflow module, or the Output 5 may be discarded.

To generate the links between executable modules 501, the workflow assembly platform 201 may rely on metadata associated with each of the selected executable modules 501 to automatically identify, select, and build links that are compatible with the selected executable modules 501. As mentioned above, the workflows may be associated with one or more executable objects including data identifying the executable modules included within those workflows. When the workflow is later executed (e.g., by the execution platform) the stored object enables the included executable modules to be retrieved, called, referenced, and/or the like utilizing provided input data, and data may be appropriately passed between executable modules via generated links (such as Beam or Cascading APIs, which may be generated at the time of execution in certain embodiments) and/or temporary storage locations in memory and/or on disk for storing intermediate data.

Moreover, the workflow assembly platform 201 may be configured to automatically determine an appropriate structure for the workflow for inclusion of the various executable modules. For example, the workflow assembly platform 201 may be configured to determine characteristics of the desired output of the workflow (e.g., data type, data shape, data format, and/or the like) and to structure the various executable modules (and to build appropriate links) to provide the desired output. With reference to FIG. 5A as a simplified example, the workflow assembly platform 201 may determine that the desired output of a workflow containing the Module 1 and Module 2 executable modules 501 is an output containing Output A, Output B, Output C, and Output D. To reach this desired output, the workflow assembly platform 201 automatically determines that the Module 1 executable module 501 should be structured to feed data into the Module 2 executable module 501, and the Module 2 executable module 501 provides the ultimate output of the workflow. Thus, in addition to providing the link shown in FIG. 5A, the workflow assembly platform 201 is additionally configured to determine the appropriate order for inclusion of each of the executable modules 501 (e.g., Module 1 and Module 2) within the workflow, and then to provide the appropriate links 510 based on the determined structure of the workflow.

In certain embodiments, the workflow assembly platform 201 additionally receives various characteristics of the generated workflow to be stored as metadata associated with the workflow. For example, the workflow assembly platform 201 may be configured to receive data indicative of a workflow title, a developer/requestor of the workflow, an organization associated with the workflow, global configuration options for the workflow (such data may be generated at least partially automatically, based at least in part on configuration options for executable modules included within the workflow), required data input types (such data may be generated automatically based at least in part on the required inputs for the included executable modules), generated data output types (such data may be generated automatically based at least in part on the generated outputs of the included executable modules), a listing of included executable modules (such data may be generated automatically), and/or the like.

With reference again to FIG. 7, the workflow assembly platform 201 assembles the workflow by linking the various executable modules, as indicated at step/operation 704. In certain embodiments, the workflow assembly platform 201 generates an executable object comprising, identifying, and/or otherwise providing links to the various executable modules 501 that cause each of the executable modules to execute upon being called by the assembled executable object associated with the workflow generated by the workflow assembly platform 201. The workflow assembly program 201 may, in certain embodiments, cache assembled binaries, artifacts, and/or compiled code associated with the various executable modules of a particular workflow for optimization purposes. In yet other embodiments, the workflow assembly platform 201 generates copies of each of the executable modules 501 to be included in the workflow, and stores those executable module copies within a repository of executable program files that collectively defines the workflow. An executable program file corresponding to a particular workflow may comprise and/or be stored in association with metadata indicative of various characteristics of the workflow, as indicated above. As a part of the linking process, the workflow assembly platform 201 may be configured to establish links or separate executable modules configured to generate trigger events for each of the executable modules 501 that cause those programs to execute as needed (e.g., sequentially and/or in parallel) to perform all of the steps of the workflow. For example, the workflow assembly platform 201 may be configured to provide code snippets within the links that are configured to constantly monitor a specified storage location for a data output file generated by a first executable module 501, and to execute the program code of the link upon detection of the output file. The same link may be configured to trigger execution of a second executable module 501 upon completion of the program code of the link, such that the second executable module 501 retrieves and processes the data output of the link. It should be understood that this is only one example of triggering execution of the various executable modules 501 included within a workflow, and any of a variety of methodologies may be utilized to trigger execution of those executable modules 501.

As shown at step/operation 705, the workflow assembly platform 201 generates a workflow object that may be referenced and/or executed by the execution platform. In certain embodiments, the workflow object may be stored in one or more databases associated with the workflow assembly platform 201. For example, the workflow object may be stored in the executable module store 211 (e.g., together with any executable modules and/or references to executable modules stored therein) or the workflow object may be stored in a separate data store accessible to the workflow assembly platform 201 and/or the one or more execution platforms 202. In certain embodiments, the workflow object may be associated with metadata indicative of various characteristics of the workflow (e.g., as generated based at least in part on the workflow assembly platform determining various characteristics of the workflow based at least in part on corresponding characteristics of the included executable modules). For example, the metadata associated with the workflow may be indicative of estimated run-times, estimated resource usage for execution (e.g., provided in terms of processing power required, cost to run the workflow, and/or the like). Such metadata may be stored in association with the workflow object and may be provided (e.g., via a user interface) upon accessing the workflow object.

Moreover, the workflow assembly platform 201 may be configured to generate a graph (e.g., a directed acyclic graph) indicative of data flows between and/or through various executable modules and indicative of various steps performed during the execution of a particular compiled workflow. The generated graph may be stored in association with the compiled workflow, and may be provided, for example, as a visual display within a user interface that may be provided to users of the workflow assembly platform 201. In certain embodiments, the graph may be generated automatically, and may provide granular data regarding characteristics of the compiled workflow. For example, the graph may provide granular data regarding the estimated execution time for each portion (e.g., executable module) included within the workflow which may be determined during a verification process as discussed herein.

Although not shown, certain embodiments of the workflow platform 100 may comprise a plurality of workflow assembly platforms 201, which may be embodied as physically separate server computing entities 200, or as separate operating instances running on shared server computing entities 200. These plurality of workflow assembly platforms 201 may be configured to enable multiple users (e.g., using respective user computing entities 30) to simultaneously build workflows without impact from other build processes. The servers associated with the workflow assembly platforms 201 may be scalable, such that the available processing power is expanded or contracted based on the amount of processing resources required to handle requests generated by the one or more user computing entities 30.

c. Execution Platform Operation

As indicated at FIG. 4, the workflow assembly platform 201 is in communication (e.g., directly or indirectly) with one or more execution platforms 202 configured to execute various programs utilizing various data. In certain embodiments, the workflow assembly platform 201 and execution platforms 202 respectively define build environments and execution environments for various workflows, and the build environments and execution environments may be separated by an isolation layer that may be configured for manipulating deployment configurations for various workflows passed from the build environment to the execution environment. For example, Apache Beam® may be utilized as an isolation layer between the build environment and execution environment to provide interfaces for modifying execution parameters of the generated workflows.

In certain embodiments, the execution platforms 202 may be configured for executing various executable modules alone, or for executing workflows encompassing a plurality of linked/bound executable modules. Like the workflow assembly platforms 201, the workflow platform 100 may comprise a plurality of execution platforms 202 (e.g., either separate server computing entities 200 or separate operating instances within shared server computing entities 200). The execution platforms 202 may be sufficiently distinct that data (e.g., raw data retrieved from raw data database 213) is not shared between execution platforms 202. For example, in instances in which the various execution platforms 202 are utilized to execute workflows analyzing data for various medical procedure patients, medical insurance members, and/or the like, the execution platforms 202 remain distinct such that data is not visible between the execution platforms 202. Moreover, the separate execution platforms 202 are associated with separate (and sometimes scalable) processing resources, such that a resource-intensive workflow executing via a first execution platform 202 does not impact the execution speed of a second workflow executing on a second execution platform 202.

Figure 16:
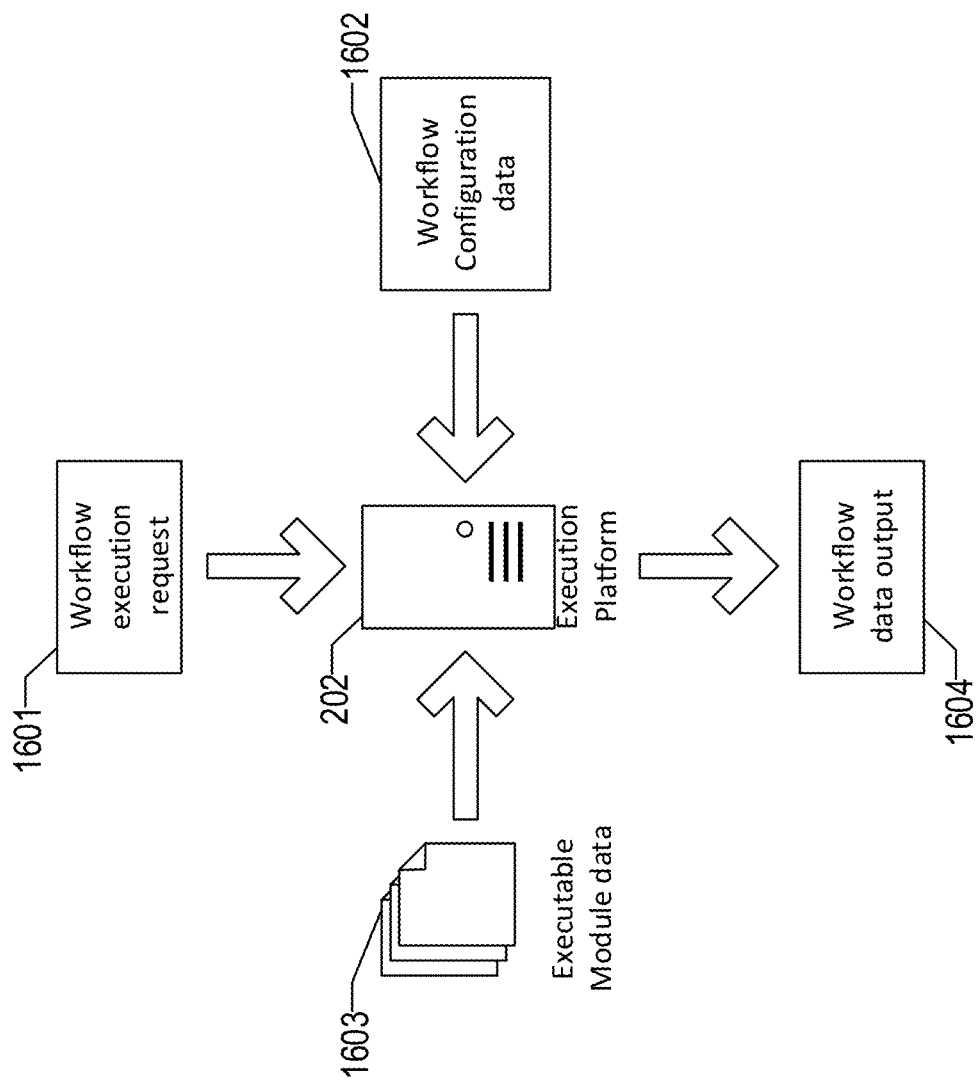
FIG. 16 schematically illustrates various data flows operating in association with an execution platform according to various embodiments.

FIG. 16 schematically illustrates the functionality of an execution platform according to various embodiments. The execution platforms 202 may be directly accessible via the communications network 135 to receive workflow execution requests 1601 from various user computing entities 30 to execute one or more workflows generated via the workflow assembly platform 201. Upon receipt of such a request, the execution platform 202 retrieves workflow configuration data corresponding to and/or encompassing the workflow from storage (e.g., stored within the executable module store 211), and initializes the workflow. As a part of executing the workflow, the execution platform 202 dynamically retrieves, queries, and/or otherwise accesses executable module data 1603 associated with the various executable modules encompassed within the workflow. Moreover, the execution platform 202 may be configured to receive user input regarding requested configuration options for the workflow (if applicable). For example, various workflows may be configured to enable users to turn on/off individual executable modules included therein, such that the workflow does/does not generate output data based on the execution of those executable modules, depending on the user selection of the configuration options.

Upon execution of a particular workflow (and the encompassed executable modules), the execution platform 202 is configured to ensure the input requirements for each included executable module are satisfied prior to execution of the workflow, and to ensure data is properly passed between executable modules via generated links included within the workflow. The workflow may comprise steps for retrieving various data for processing, for example, from a raw data database 213 (which itself may be populated from one or more third party computing entities, as represented by the arrow leading into the raw data database 213 shown in FIG. 4), and ultimately the execution platform 202 generates a workflow data output 1604 comprising data generated from executing the workflow. It should be noted that the data utilized by the workflow is consistent with the metadata of each individual executable module encompassed within the workflow. As an example with reference to FIG. 5A, the workflow retrieves data for each of Input 1, Input 2, Input 3, and Input 4 from the raw data database 213 to initialize the workflow, and each of these data inputs has the format of (1) an array, (2) a square array, (3) a binary input, and (4) an array, respectively.

Upon execution, the workflow may be configured to generate a data output that may be stored via an output data database 214. The data output may be provided in accordance with user specified parameters indicating a preferred data output format, a preferred storage location (or additional executable program) where the data output is to be provided, and/or the like. Like the execution platforms 202, data stored within the output data database 214 may be stored in discrete database instances as needed to maintain data separately. Moreover, the execution platform 202 may be configured to monitor various executable modules (e.g., analytics) of a workflow while executing, such as monitoring the actual runtime, monitoring the resources utilized during execution, and/or the like. Data collected that is indicative of the various executable modules (e.g., analytics) may be stored and/or provided to the workflow assembly platform 201, which may be configured to update the metadata associated with the workflow to reflect updated execution characteristics of the workflow. For example, stored data indicative of estimated runtimes for a particular workflow may be updated based on data indicative of actual, observed runtimes (e.g., by averaging the runtime for each time the workflow is executed, replacing a prior runtime estimate with a most-recently observed runtime, and/or the like).

V. EXAMPLE IMPLEMENTATION

As just one example implementation, the workflow platform 100 may be configured to generate one or more workflows for analyzing patient insurance data, healthcare provider operations data, and/or the like. FIGS. 8-15 illustrate example user interface presentations presented to a user (e.g., via a user computing entity 30) for interacting with a workflow platform 100 in accordance with such an example.

Figure 8:
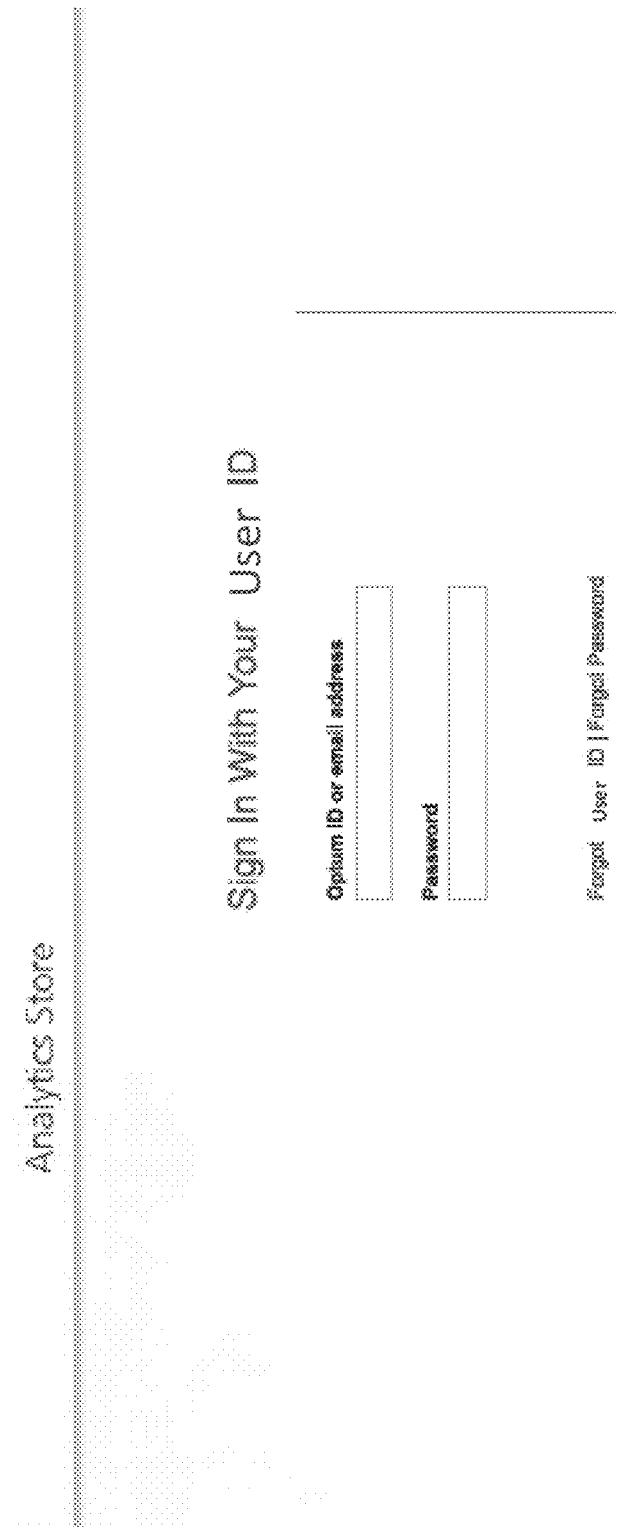

Beginning at FIG. 8, the workflow platform 100 may present a user with a login presentation to accept user input of user credentials. The workflow platform 100 may be accessible only to registered users, and accordingly the workflow platform 100 may be configured to accept and validate user credentials prior to permitting access to various portions of the workflow platform 100. Moreover, as mentioned herein, various data stored in association with the workflow platform 100 may be protected against unauthorized entry, and only subsets of this data may be accessible to each user. Accordingly, validating user credentials ensures that the user only receives access to data for which the user is authorized. Finally, although illustrated as a fielded-text entry presentation for accepting user input of a user identifier and a password, it should be understood that the workflow platform 100 may be configured to accept user credentials in any of a variety of formats (e.g., fingerprint scan, eye scan, facial recognition, stored user device 30 recognition, and/or the like).

Upon acceptance and validation of the user input, the workflow platform 100 may provide a landing presentation for the user, which may present the user with relevant information and/or other announcements (which may be machine-generated and/or generated by a user via an appropriate user interface). As noted at the top right corner of the provided example landing presentation of FIG. 9, the landing presentation additionally provides identifying information about the currently-logged in user, and provides an option for logging out of the system.

The workflow platform 100 further provides users with a listing of available executable modules and/or workflows that may be added to a workflow via a user interface presentation as indicated at FIG. 10. As shown in FIG. 10, the listing of available executable modules may comprise an executable module name (each workflow is indicated as an "analytic" in FIG. 10), a brief description, a version number, a status of the workflow, and/or the like. Moreover, the executable modules may be organized categorically, as indicated in FIG. 10, or via any other characteristic of the executable modules as indicated in metadata corresponding with the executable modules. Moreover, as indicated at FIG. 10, the user interface may provide users with options to add new executable modules (or workflows), to edit existing executable modules, to delete existing executable modules, and/or the like. The user interface presentation may additionally provide users with search functionalities to search for particular executable modules satisfying one or more criteria as specified by the user (e.g., matching a user-input text string).

Figure 11:
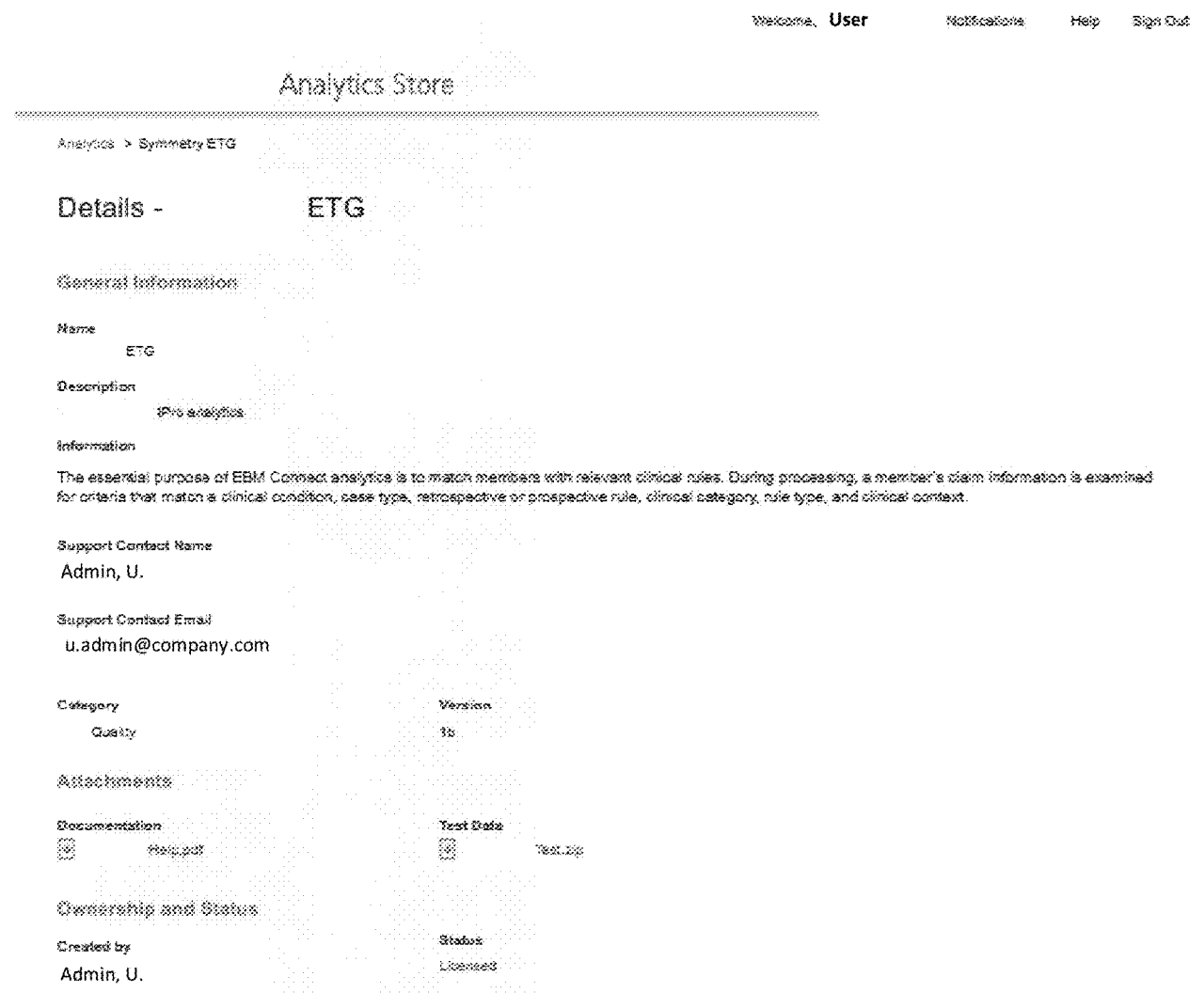

Selecting a particular executable module (e.g., clicking on the title of a particular executable module) directs the user device 30 to display a detailed summary presentation for the selected executable module, as indicated at FIG. 11. As shown therein, the detailed summary presentation provides detailed information about the selected executable module, including the executable module name, a description, contact information for supporting individuals (e.g., the creator of the executable module) categorical information for the executable module, version number, and/or the like. The detailed summary presentation may additionally provide users with links to attached documents, such as an instruction manual for the executable module. Moreover, the detailed summary presentation provides a link to access the executable module itself (e.g., to download the executable module to the user computing entity 30, and/or to access a server-based version of the executable module).

Figure 12:
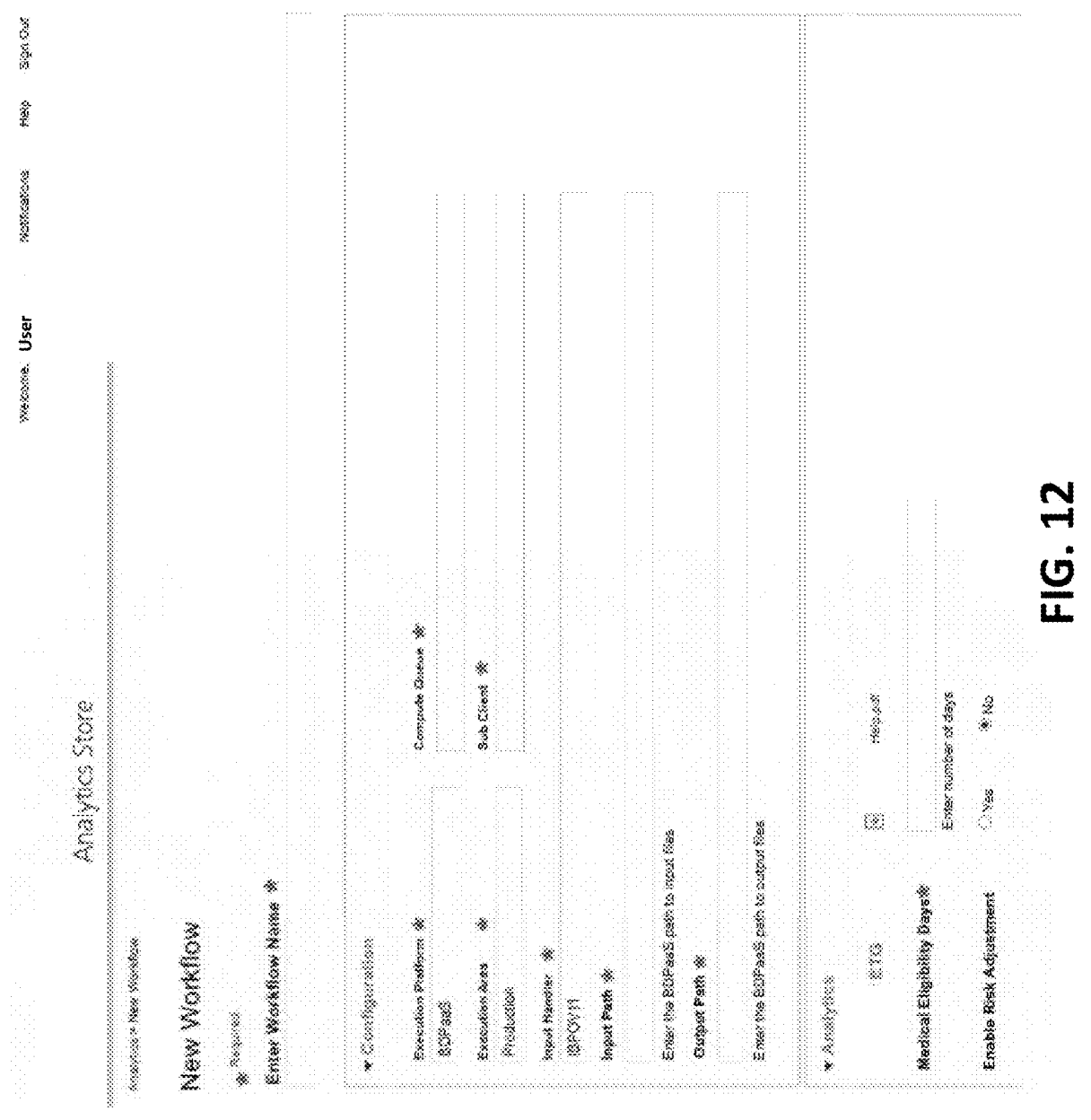

By selecting an interactive user interface object linking the user to a presentation to add a new workflow (e.g., via the listing of available executable modules and/or workflows), the user computing entity 30 is directed to a workflow creation presentation, as indicated at FIG. 12. As shown therein, the workflow creation presentation enables the user to provide information regarding the newly created workflow, such as an intended execution platform, input path (e.g., source of input data), output path (e.g., location for storing generated data), and/or the like. Moreover, the workflow creation presentation enables users to select one or more executable modules for inclusion within the workflow. In the illustrated example, the "Symmetry ETG" executable module has been added to the workflow, and the workflow creation presentation enables one or more executable module-specific options (if applicable) for the selected executable module. Although not shown in FIG. 12, additional executable modules may be displayed via the workflow creation presentation. Entry of data via the workflow creation presentation provides executable instructions to the workflow assembly platform 201 to retrieve selected executable modules and to assemble necessary interface programs to operate the workflow as discussed herein.

In certain embodiments, upon detection of one or more errors for one or more of the executable modules (e.g., based on a comparison of metadata indicative of required input and output types for selected executable modules), the workflow assembly platform 201 provides an alert via the generated interface presentation (e.g., via a pop-up window) indicating to the user that the workflow is unable to successfully run. For example, upon detection of an input error indicating that the input path data, combined with the various selected executable modules does not provide all of the necessary input types to satisfy each and every input of the selected executable modules, the workflow assembly platform 201 may generate an alert indicative of the input error. For example, with reference again to FIG. 5B, the workflow assembly platform 201 may generate an alert upon detecting that the input path combined with the Module 3 executable module 501 does not provide the Module 4 executable module 501 with all of the necessary inputs to operate properly.

Figure 13:
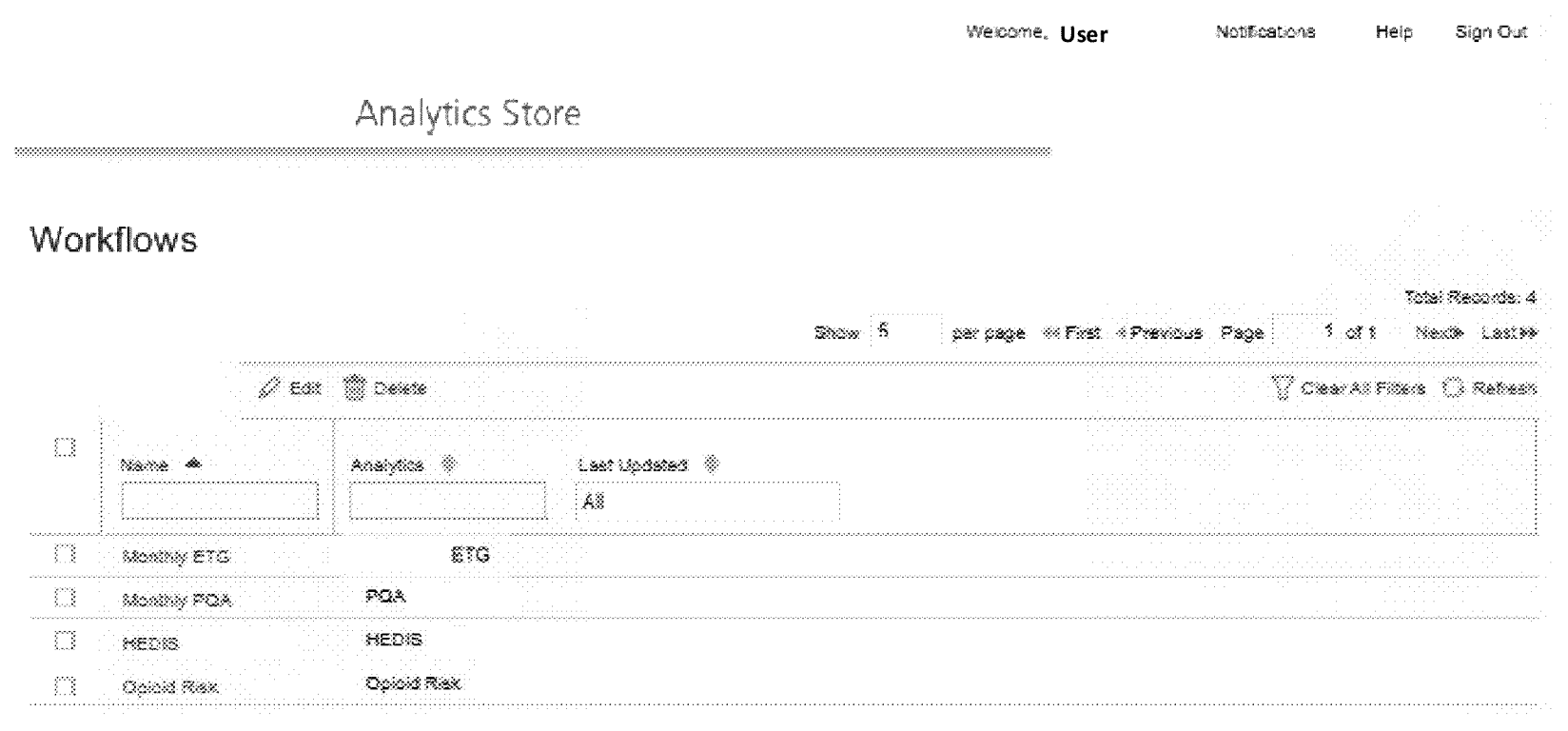

In certain embodiments, upon the workflow assembly platform 201 completing the workflow and compiling and/or testing the same, the workflow may be stored for later use, and may be provided within a listing of available workflows, as indicated at FIG. 13. Moreover, the various workflows may be selected for automatic execution (e.g., via execution platforms 202), and the status of these operations may be provided via a separate user interface presentation, as indicated at FIG. 14. As shown therein, the user interface presentation may provide information regarding the workflow title, the status of the workflow, when the workflow most recently executed (start time, end time, and/or total run time), the amount of data consumed by the workflow (e.g., the number of patients' data considered during execution of a patient-health related workflow, the number of records considered, the number of records discarded, and/or the like), an estimated runtime of the workflow, and/or the like.

Figure 15:
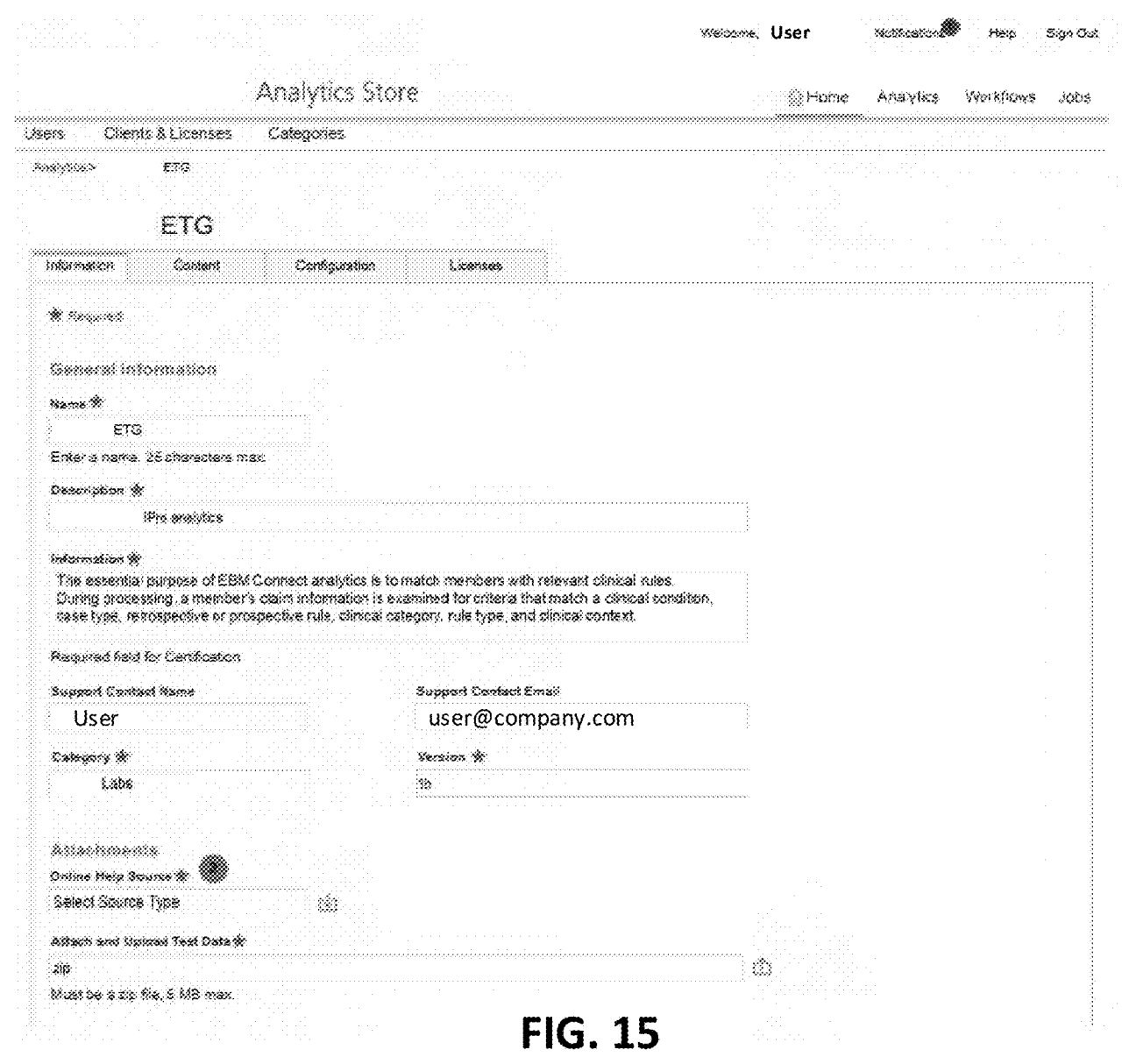

Moreover, as indicated at FIG. 15, the user interface system may provide developers with access to executable module generation user interface presentations for providing information/data about generated executable modules for uploading to the executable module store 211. For example, a developer may provide information regarding the name of a particular executable module, a description of the executable module, contact information for support, attachments, version types, required data input, generated data output, and/or the like. Moreover, the user interface may provide operation for uploading the executable module and/or any supporting documentation for storage within the executable module store 211.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An automated workflow generation platform for generating and executing composite workflows, the automated workflow generation platform comprising: an assembly server and a plurality of execution servers one or more memory storage areas configured for storing a plurality of executable modules, wherein the executable modules each comprise executable binaries and corresponding program metadata; and one or more processors, the automated workflow generation platform configured to:

store a plurality of executable modules, wherein (a) each executable module comprises a corresponding executable binary, and (b) each executable module comprises corresponding metadata indicative of a data input format and a data output format;

provide an interface presentation for display by a client computing entity, wherein the interface presentation comprises a selectable element corresponding to each executable module;

receive input selecting a first executable module and a second executable module of the plurality of executable modules for inclusion in a composite workflow for analyzing data, wherein (a) the input selecting the first executable module and the second executable module is input via the interface, (b) the data input format for the first executable module is a first data format and the data output format for the first executable module is a second data format, and (c) the data input format for the second executable module is the second data format and the data output format for the second executable module is a third data format;

responsive to receiving input selecting the first executable module and the second executable module for inclusion in the composite workflow, automatically generate, by the assembly server, the composite workflow comprising the first executable module and the second executable module, wherein (a) the metadata for the first executable module and the metadata for the second executable module are used to determine an execution order of the first executable module and the second executable module, (b) generating the composite workflow comprises linking the output of the first executable module to the input of the second executable module based at least in part on the metadata for the first executable module and the metadata for the second executable module, and (c) the composite workflow comprises a first executable binary corresponding to the first executable module and a second executable binary corresponding to the second executable module;

store the composite workflow; and dynamically provide (a) the first executable binary corresponding to the first executable module to a first execution server of the plurality of execution servers for execution at run time, and (b) the second executable binary corresponding to the second executable module to a second execution server of the plurality of execution servers for execution at run time.

2. The automated workflow generation platform of claim 1, wherein the automated workflow generation platform is further configured to: generate an executable workflow object comprising data indicative of a directed acyclic graph comprising the first executable module and the second executable module.

3. The automated workflow generation platform of claim 1, wherein linking the output of the first executable module to input of the second executable module is further based at least in part on an application program interface generated by a development platform.

4. The automated workflow generation platform of claim 1, wherein the automated workflow generation platform is further configured to execute the composite workflow based at least in part on the first data set.

5. The automated workflow generation platform of claim 1, wherein the automated workflow generation platform is further configured to determine whether there are any unresolvable errors between the first executable module and the second executable module.

6. The automated workflow generation platform of claim 1, wherein the automated workflow generation platform is further configured to provide at least one foundational executable module for display by the client computing entity.

7. The automated workflow generation platform of claim 1, wherein the automated workflow generation platform is further configured to:

determine the order of execution of the first executable module and the second executable module based at least in part on the first executable module being a foundational executable module.

8. A computer-implemented method for generating and executing composite workflows, the method comprising:

storing, by a system comprising an assembly server and a plurality of execution servers, a plurality of executable modules, wherein (a) each executable module comprises a corresponding executable binary, and (b) each executable module comprises corresponding metadata indicative of a data input format and a data output format;

providing, by the system, an interface presentation for display by a client computing entity, wherein the interface presentation comprises a selectable element corresponding to each executable module;

receiving, by the system, input selecting a first executable module and a second executable module of the plurality of executable modules for inclusion in a composite workflow for analyzing data, wherein (a) the input selecting the first executable module and the second executable module is input via the interface, (b) the data input format for the first executable module is a first data format and the data output format for the first executable module is a second data format, and (c) the data input format for the second executable module is the second data format and the data output format for the second executable module is a third data format;

responsive to receiving input selecting the first executable module and the second executable module for inclusion in the composite workflow, automatically generating, by the assembly server, the composite workflow comprising the first executable module and the second executable module, wherein (a) the metadata for the first executable module and the metadata for the second executable module are used to determine an execution order of the first executable module and the second executable module, (b) generating the composite workflow comprises linking the output of the first executable module to the input of the second executable module based at least in part on the metadata for the first executable module and the metadata for the second executable module, and (c) the composite workflow comprises a first executable binary corresponding to the first executable module and a second executable binary corresponding to the second executable module;

storing, by the system, the composite workflow;

dynamically providing, by the assembly server, (a) the first executable binary corresponding to the first executable module to a first execution server of the plurality of execution servers for execution at run time, and (b) the second executable binary corresponding to the second executable module to a second execution server of the plurality of execution servers for execution at run time.

9. The computer implemented method of claim 8, further comprising generating an executable workflow object comprising data indicative of a directed acyclic graph comprising the first executable module and the second executable module.

10. The computer implemented method of claim 8, wherein linking the output of the first executable module to input of the second executable module is further based at least in part on an application program interface generated by a development platform.

11. The computer implemented method of claim 8, further comprising executing the composite workflow based at least in part on a first data set.

12. The computer implemented method of claim 8, further comprising determining whether there are any unresolvable errors between the first executable module and the second executable module.

13. The computer implemented method of claim 8, further comprising providing at least one foundational executable module for display by the client computing entity.

14. The computer implemented method of claim 8, further comprising determining the order of execution of the first executable module and the second executable module based at least in part on the first executable module being a foundational executable module.

15. A computer program product for generating and executing composite workflows, the computer program product comprising a non-transitory computer readable medium having computer program instructions stored therein, the computer program instructions when executed by a system comprising an assembly server and a plurality of execution servers, cause the system processor to:

store a plurality of executable modules within at least one of a plurality of memory storage areas, wherein (a) each executable module comprises a corresponding executable binary, and (b) each executable module comprises corresponding metadata indicative of a data input format and a data output format;

provide an interface presentation for display by a client computing entity, wherein the interface presentation comprises a selectable element corresponding to each executable module:

receive input selecting a first executable module and a second executable module of the plurality of executable modules for inclusion in a composite workflow for analyzing data, wherein (a) the input selecting the first executable module and the second executable module is input via the interface, (b) the data input format for the first executable module is a first data format and the data output format for the first executable module is a second data format, and (c) the data input format for the second executable module is the second data format and the data output format for the second executable module is a third data format;

responsive to receiving input selecting the first executable module and the second executable module for inclusion in the composite workflow, automatically generate, by the assembly server, the composite workflow comprising the first executable module and the second executable module, wherein (a) the metadata for the first executable module and the metadata for the second executable module are used to determine an execution order of the first executable module and the second executable module, (b) generating the composite workflow comprises linking the output of the first executable module to the input of the second executable module based at least in part on the metadata for the first executable module and the metadata for the second executable module, and (c) the composite workflow comprises a first executable binary corresponding to the first executable module and a second executable binary corresponding to the second executable module;

store the composite workflow;

dynamically provide, by the assembly server, (a) the first executable binary corresponding to the first executable module to a first execution server of the plurality of execution servers for execution at run time, and (b) the second executable binary corresponding to the second executable module to a second execution server of the plurality of execution servers for execution at run time.

16. The computer program product of claim 15, wherein the computer program instructions when executed by the system, cause the system to generate an executable workflow object comprising data indicative of a directed acyclic graph comprising the first executable module and the second executable module.

17. The computer program product of claim 15, wherein linking the output of the first executable module to input of the second executable module is further based at least in part on an application program interface generated by a development platform.

18. The computer program product of claim 15, wherein the computer program instructions when executed by one or more server computing entities, cause the system to execute the composite workflow based at least in part on a first data set.

19. The computer program product of claim 15, wherein the computer program instructions when executed by the system, cause the system to determine whether there are any unresolvable errors between the first executable module and the second executable module.

20. The computer program product of claim 15, wherein the computer program instructions when executed by the system, cause the system to provide at least one foundational executable module for display by the client computing entity.

21. The computer program product of claim 15, wherein the computer program instructions when executed by the system, cause the system to determine the order of execution of the first executable module and the second executable module based at least in part on the first executable module being.

* * * * *

UNITED STATES PATENT AND TRADEMARK OFFICE
CERTIFICATE OF CORRECTION

PATENT NO. : 10,621,013 B2
APPLICATION NO. : 16/023744
DATED : April 14, 2020
INVENTOR(S) : Lavoie et al.

Page 1 of 1

It is certified that error appears in the above-identified patent and that said Letters Patent is hereby corrected as shown below:

In the Claims

Column 33
Line 42, In Claim 8, "storing, by the system, the composite workflow;" should read --storing, by the system, the composite workflow; and--

Column 34
Line 56, In Claim 15, "store the composite workflow;" should read --storing, by the system, the composite workflow; and--

Signed and Sealed this
Second Day of June, 2020

Andrei Iancu
*Director of the United States Patent and Trademark Office*